United States Patent
Hao et al.

(10) Patent No.: US 12,510,776 B2
(45) Date of Patent: Dec. 30, 2025

(54) DISPLAY MODULE AND DISPLAY APPARATUS

(71) Applicant: Shanghai Tianma Microelectronics Co., Ltd., Shanghai (CN)

(72) Inventors: Haili Hao, Shanghai (CN); Zhiyuan Zhang, Shanghai (CN); Fan Tian, Shanghai (CN)

(73) Assignee: Shanghai Tianma Microelectronics Co., Ltd., Shanghai (CN)

(*) Notice: Subject to any disclaimer, the term of this patent is extended or adjusted under 35 U.S.C. 154(b) by 22 days.

(21) Appl. No.: 18/606,675

(22) Filed: Mar. 15, 2024

(65) Prior Publication Data

US 2024/0248335 A1    Jul. 25, 2024

(30) Foreign Application Priority Data

Aug. 4, 2023 (CN) .......................... 202310982847.3

(51) Int. Cl.
*G02F 1/13* (2006.01)
*G02F 1/1335* (2006.01)
*G02F 1/13363* (2006.01)
*G02F 1/1337* (2006.01)
*G02F 1/1343* (2006.01)

(52) U.S. Cl.
CPC ...... *G02F 1/1323* (2013.01); *G02F 1/133531* (2021.01); *G02F 1/13363* (2013.01); *G02F 1/133749* (2021.01); *G02F 1/134309* (2013.01)

(58) Field of Classification Search
CPC ... G02F 1/1323; G02F 1/1347; G02F 1/13471
See application file for complete search history.

(56) References Cited

U.S. PATENT DOCUMENTS

| | | | | |
|---|---|---|---|---|
| 2003/0179426 A1* | 9/2003 | Ide | ..................... | G02B 26/0816 359/207.7 |
| 2010/0128200 A1* | 5/2010 | Morishita | ........... | G02F 1/13363 349/62 |
| 2024/0045243 A1* | 2/2024 | Fang | ................. | G02F 1/133531 |

FOREIGN PATENT DOCUMENTS

| CN | 110618547 A | 12/2019 |
|---|---|---|
| CN | 115877602 A | 3/2023 |

OTHER PUBLICATIONS

First Office Action (with English translation) received Aug. 19, 2025, for Chinese Application No. 202310982847.3, filed Aug. 4, 2023; 15 pages total.

* cited by examiner

*Primary Examiner* — Alexander P Gross
(74) *Attorney, Agent, or Firm* — Christensen O'Connor Johnson Kindness PLLC

(57) ABSTRACT

A display module and a display apparatus. The display module includes a display panel and a first light control panel. The first light control panel includes a first base and a second base arranged opposite to each other and a first light control liquid crystal layer arranged between the first base and the second base. The first base includes a first substrate, a first electrode, a first alignment layer, and a first polarizer. The second base includes a second substrate, a second electrode, a second alignment layer, and a second polarizer. A polarization axis of the first polarizer is perpendicular to a polarization axis of the second polarizer. An alignment direction of the first alignment layer is parallel to an alignment direction of the second alignment layer. An angle between the alignment direction of the first alignment layer and the polarization axis of the first polarizer is α, 90°>α>0°.

19 Claims, 28 Drawing Sheets

DISPLAY MODULE AND DISPLAY APPARATUS

CROSS-REFERENCE TO RELATED APPLICATIONS

The present application claims priority to Chinese Patent Application No. 202310982847.3, filed on Aug. 4, 2023, the content of which is incorporated herein by reference in its entirety.

TECHNICAL FIELD

The present disclosure relates to the technical field of displays, and in particular, to a display module and a display apparatus.

BACKGROUND

At present, general anti-peeping technology in the industry is to switch between wide and narrow views of a display screen. Specifically, viewing angle of the display screen may be changed by using a dual backlight system or an electronically controlled birefringent liquid crystal cell. However, the conventional dual backlight system may not be available for large-sized display and may consume a large amount of energy, and electronically controlled birefringent liquid crystal cell apparatuses in the prior art cannot achieve effective anti-peeping due to restriction of a liquid crystal deflection range. Consequently, the these conventional solutions are limited in achieving an anti-peeping effect.

SUMMARY

An embodiment of the present disclosure provides a display module and a display apparatus.

In a first aspect, an embodiment of the present disclosure provides a display module, including a display panel and a first light control panel. The display panel is arranged at a side of the first light control panel. The first light control panel includes a first base and a second base arranged opposite to each other and a first light control liquid crystal layer arranged between the first base and the second base. The first base includes a first substrate, a first electrode, a first alignment layer, and a first polarizer. The first electrode and the first alignment layer are arranged at a side of the first substrate facing the first light control liquid crystal layer. The first polarizer is arranged at a side of the first substrate. The second base includes a second substrate, a second electrode, a second alignment layer, and a second polarizer. The second electrode and the second alignment layer are arranged at a side of the second substrate facing the first light control liquid crystal layer. The second polarizer is arranged at a side of the second substrate. A polarization axis direction of the first polarizer is perpendicular to a polarization axis direction of the second polarizer. An alignment direction of the first alignment layer is parallel to an alignment direction of the second alignment layer, an angle between the alignment direction of the first alignment layer and the polarization axis direction of the first polarizer is $\alpha$, where $90°>\alpha>0°$.

In a second aspect, an embodiment of the present disclosure provides a display apparatus, including the display module including a display panel and a first light control panel. The display panel is arranged at a side of the first light control panel. The first light control panel includes a first base and a second base arranged opposite to each other and a first light control liquid crystal layer arranged between the first base and the second base. The first base includes a first substrate, a first electrode, a first alignment layer, and a first polarizer. The first electrode and the first alignment layer are arranged at a side of the first substrate facing the first light control liquid crystal layer. The first polarizer is arranged at a side of the first substrate. The second base includes a second substrate, a second electrode, a second alignment layer, and a second polarizer. The second electrode and the second alignment layer are arranged at a side of the second substrate facing the first light control liquid crystal layer. The second polarizer is arranged at a side of the second substrate. A polarization axis direction of the first polarizer is perpendicular to a polarization axis direction of the second polarizer. An alignment direction of the first alignment layer is parallel to an alignment direction of the second alignment layer, an angle between the alignment direction of the first alignment layer and the polarization axis direction of the first polarizer is $\alpha$, where $90°>\alpha>0°$.

BRIEF DESCRIPTION OF THE DRAWINGS

In order to illustrate the technical solutions of the embodiments of the present disclosure more clearly, the accompanying drawings required in the embodiments will be briefly introduced as below. The accompanying drawings in the following description show merely some examples of the present disclosure, and a person of ordinary skill in the art can also derive other drawings from these accompanying drawings.

DETAILED DESCRIPTION

Figure 1:
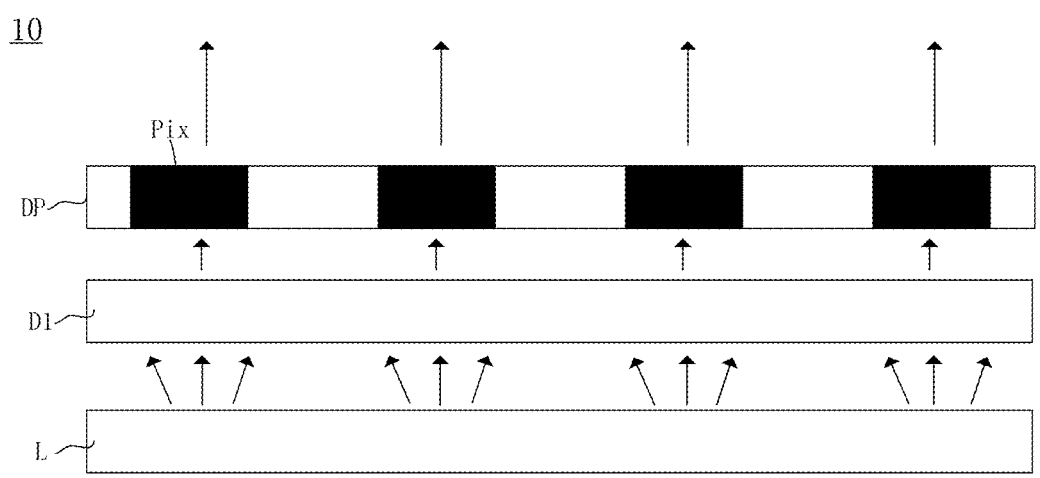
FIG. 1 is a schematic diagram of a display module according to an embodiment of the present disclosure.

In order to better understand the technical solutions of the present disclosure, the embodiments of the present disclosure will be described in detail as below with reference to the accompanying drawings.

It should be noted that, the described embodiments are merely parts, but not all, of the embodiments of the present disclosure. Based on the embodiments of the present disclosure, all other embodiments obtained by a person of ordinary skill in the art shall fall within the protection scope of the present disclosure.

Terms in the embodiments of the present disclosure are merely used to describe the specific embodiments, and are not intended to limit the present disclosure. Unless otherwise specified in the context, words, such as "a", "the", and "said", in a singular form in the embodiments and appended claims of the present disclosure also include plural forms.

It should be understood that the term "and/or" in this specification merely describes associations between associated objects, and it indicates three types of relationships. For example, A and/or B may indicate that A exists alone, A and B exist at the same time, or B exists alone. In addition, the character "/" in this specification generally indicates that the preceding and subsequent associated objects are in an "or" relationship.

In the description of this specification, it should be understood that the terms such as "substantially", "approximate to", "approximately", "about", "basically", and "in general" described in the claims and embodiments of the present disclosure refer to general agreement within a reasonable process operation range or tolerance range, rather than an exact value.

It should be understood that although the terms such as "first", "second", and "third" may be used to describe structures such as liquid crystal layers, polarizers, and alignment layers in the embodiments of the present disclosure, these structures such as the liquid crystal layers, the polarizers, and the alignment layers should not be limited to these terms. These terms are used only to distinguish the structures such as the liquid crystal layers, the polarizers, and the alignment layers from one another. For example, without departing from the scope of the embodiments of the present disclosure, a first polarizer may also be referred to as a second polarizer, and similarly, a second polarizer may also be referred to as a first polarizer.

The present disclosure provides a solution to solve the problems in the prior art.

Current white-state anti-peeping technical solutions commonly adopt a dual backlight system, an electronically controlled birefringent liquid crystal cell, and the like, in which anti-peeping are achieved by means of switching between wide and narrow viewing angles of a display screen. However, the current anti-peeping solution has limited anti-peeping performance and thus cannot achieve a good display effect.

For example, the dual backlight system usually uses structures such as a grating and a light guide plate to switch a display apparatus between a sharing mode and an anti-peeping mode. However, the light guide plate cannot be available for large-sized display and the grating causes a high loss of display light, thereby affecting the display effect.

For example, the structure of the common electronically controlled birefringent liquid crystal cell is affected by factors such as an alignment direction of liquid crystals and a polarization axis direction of a polarizer. Therefore, the liquid crystals inside the cell are deflected merely in a direction parallel to a surface of the liquid crystal cell. As a result, part of display light with a large viewing angle can still be observed by human eyes through the liquid crystal cell.

Figure 2:
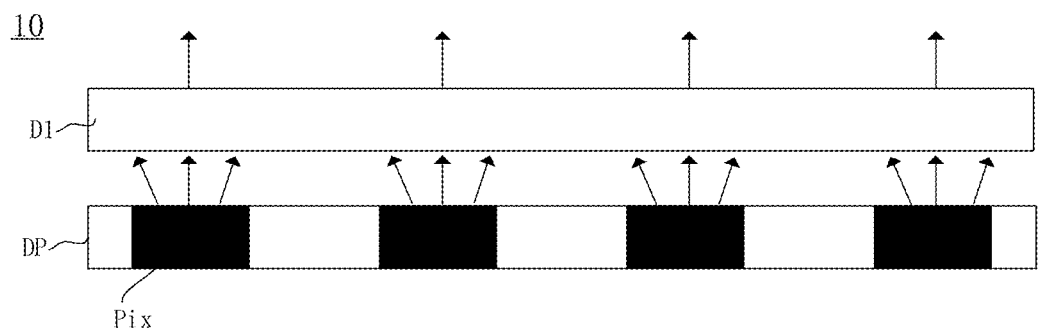
FIG. 2 is a schematic diagram of a display module according to an embodiment of the present disclosure.

FIG. 1 is a schematic diagram of a display module according to an embodiment of the present disclosure. FIG. 2 is a schematic diagram of a display module according to an embodiment of the present disclosure.

To resolve the problem existing in the foregoing white-state anti-peeping technology, an embodiment of the present disclosure provides a display module 10. As shown in FIG. 1 and FIG. 2, the display module 10 includes a display panel DP and a first light control panel D1. The display panel DP is arranged at a side of the first light control panel D1. The first light control panel D1 is configured to control a propagation direction of light emitted from the display panel DP. Alternatively, the first light control panel D1 is configured to control a propagation direction of light incident on the display panel DP, such that the display module 10 can achieve anti-peeping display and shared display.

In an embodiment, as shown in FIG. 1, the first light control panel D1 may be provided at a backlight side of the display panel DP. In this case, the first light control panel D1 controls a propagation angle of the light incident on the display panel DP. When the first light control panel D1 controls an angle between the propagation direction of the light incident on the display panel DP and a direction perpendicular to a surface of the display panel DP to be relatively small, an angle between the propagation direction of the light emitted from the display panel DP and the direction perpendicular to the surface of the display panel DP is also relatively small. In this case, anti-peeping display can be achieved. When the first light control panel D1 controls an angle between a propagation direction of part of the light incident on the display panel DP and the direction perpendicular to the surface of the display panel DP to be relatively large, an angle between the propagation direction of the light emitted from the display panel DP and the direction perpendicular to the surface of the display panel DP is also relatively large. In this case, shared display can be achieved.

In an embodiment, as shown in FIG. 1, the display module 10 further includes a backlight plate L. The first light control panel D1 is arranged between the display panel DP and the backlight plate L. The backlight plate L may provide the display panel DP with light required for display. However, light emitted from the backlight plate L first passes through the first light control panel D1, and then is incident on the display panel DP. The first light control panel D1 controls a propagation direction of the light provided by the backlight plate L. For example, in an anti-peeping mode, after the light emitted from the backlight plate L passes through the first light control panel D1, an angle between a propagation direction of light emitted from the first light control panel D1 and the direction perpendicular to the surface of the display panel DP is relatively small. In a sharing mode, after the light emitted from the backlight plate L passes through the first light control panel D1, an angle between a propagation direction of light emitted from the first light control panel D1 and the direction perpendicular to the surface of the display panel DP is relatively large.

In an embodiment, the display panel DP may be a passive light emission display panel, for example, a liquid crystal display panel.

In an embodiment, as shown in FIG. 2, the first light control panel D1 may be provided at a light exit surface side of the display panel DP. In this case, the first light control panel D1 controls a propagation angle of the light emitted from the display panel DP. The light emitted from the display panel DP is incident on the first light control panel D1. When the first light control panel D1 controls an angle between a propagation direction of light emitted from the first light control panel D1 in the light and a direction perpendicular to a surface of the display panel DP to be relatively small, anti-peeping display can be achieved. When the first light control panel D1 controls an angle between a propagation direction of part of the light emitted from the first light control panel D1 in the light and the direction perpendicular to the surface of the display panel DP to be relatively large, the shared display can be achieved.

In an embodiment, the display panel DP may be a passive light emission display panel, for example, a liquid crystal display panel. In addition, the display panel DP may also be an active light-emitting display panel. For example, the display panel DP is an organic light-emitting display panel, a micro light-emitting diode (Micro-LED) display panel, or a sub-millimeter light-emitting diode (Mini-LED) display panel.

The inventive technology of the present disclosure is illustrated below through an example in which the first light control panel D1 is arranged between the display panel DP and the backlight plate L. Nevertheless, the inventive technology of the present disclosure is not limited to the situation that the first light control panel D1 is arranged between the display panel DP and the backlight plate L.

Figure 3:
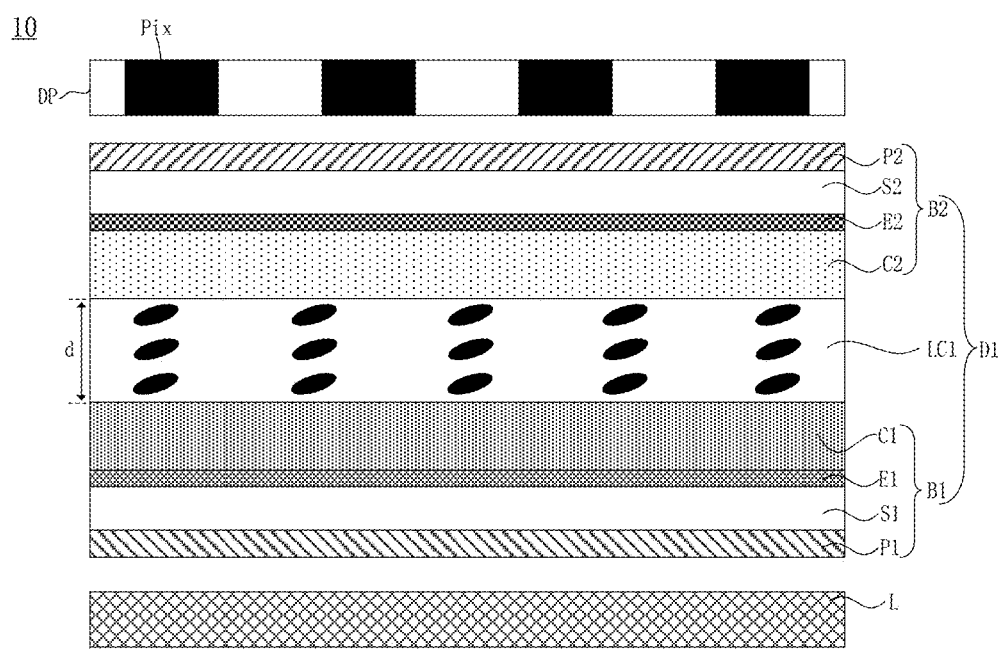
FIG. 3. is a partial schematic structural diagram of a display module according to an embodiment of the present disclosure.
Figure 4:
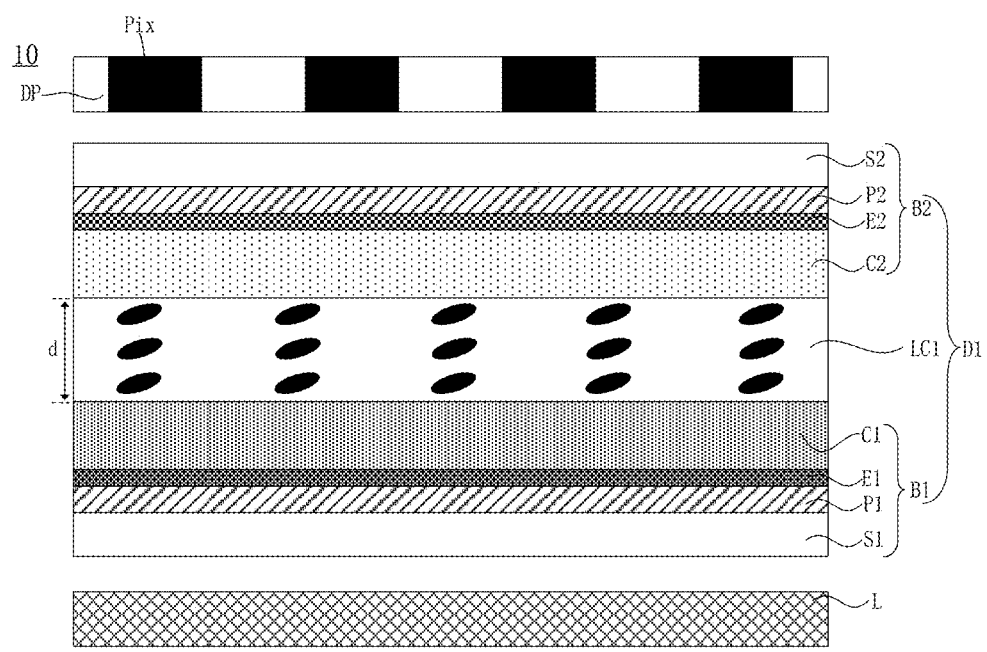
FIG. 4. is a partial schematic structural diagram of a display module according to an embodiment of the present disclosure.

FIG. 3. is a partial schematic structural diagram of a display module according to an embodiment of the present disclosure. FIG. 4. is a partial schematic structural diagram of a display module according to an embodiment of the present disclosure.

As shown in FIG. 3 and FIG. 4, the first light control panel D1 includes a first base B1, a second base B2, and a first light control liquid crystal layer LC1. The first base B1 and the second base B2 are arranged opposite to each other. The first light control liquid crystal layer LC1 is arranged between the first base B1 and the second base B2.

The first base B1 includes a first substrate S1, a first electrode E1, a first alignment layer C1, and a first polarizer P1. The first electrode E1 and the first alignment layer C1 are arranged at a side of the first substrate S1 facing the first light control liquid crystal layer LC1. The first electrode E1 may be arranged between the first substrate S1 and the first alignment layer C1. The first polarizer P1 is arranged at a side of the first substrate S1. For example, as shown in FIG. 3, the first polarizer P1 is arranged at a side of the first substrate S1 facing the backlight plate L. Alternatively, as shown in FIG. 4, the first polarizer P1 is arranged at a side of the first substrate S1 facing the first light control liquid crystal layer LC1.

The second base B2 includes a second substrate S2, a second electrode E2, a second alignment layer C2, and a second polarizer P2. The second electrode E2 and the second alignment layer C2 are arranged at a side of the second substrate S2 facing the first light control liquid crystal layer LC1. The second electrode E2 may be arranged between the second substrate S2 and the second alignment layer C2. The second polarizer P2 is arranged at a side of the second substrate S2. For example, as shown in FIG. 4, the second polarizer P2 is arranged at a side of the second substrate S2 facing the first light control liquid crystal layer LC1. Alternatively, as shown in FIG. 3, the second polarizer P2 is arranged at a side of the second substrate S2 facing the display panel DP.

It should be noted that, when the first polarizer P1 is arranged at the side of the first substrate S1 facing the first light control liquid crystal layer LC1, the first polarizer P1 may be a metal grating deposited on the first substrate S1. When the second polarizer P2 is arranged at the side of the second substrate S2 facing the first light control liquid crystal layer LC1, the second polarizer P2 may also be a metal grating deposited on the second substrate S2. When the first polarizer P1 is arranged at the side of the first substrate S1 facing the backlight plate L, the first polarizer P1 may be a polarizer attached to the first substrate S1, or may be a metal grating deposited on the first substrate S1. When the second polarizer P2 is arranged at the side of the second substrate S2 facing the display panel DP, the second polarizer P2 may be a polarizer attached to the second substrate S2, or may be a metal grating deposited on the second substrate S2.

The first substrate S1 and the second substrate S2 may be rigid transparent substrates such as glass, or may be an organic transparent substrates such as resin.

The first electrode E1 and the second electrode E2 can receive respective different electrical signals and generate different electric fields to control liquid crystals in the first light control liquid crystal layer LC1 to deflect to different degrees, and then to control a transmittance and a propagation angle of light passing through the first light control liquid crystal layer LC1.

The first alignment layer C1 and the second alignment layer C2 are used to control the liquid crystals in the first light control liquid crystal layer LC1 to be arranged in a specific direction and at a specific angle, and to control an initial deflection angle of each of the liquid crystals.

The first polarizer P1 can convert light emitted from the backlight plate L into linearly polarized light with a specific polarization direction. The second polarizer P2 can control the light with the specific polarization direction to pass through the first light control panel D1.

Figure 5:
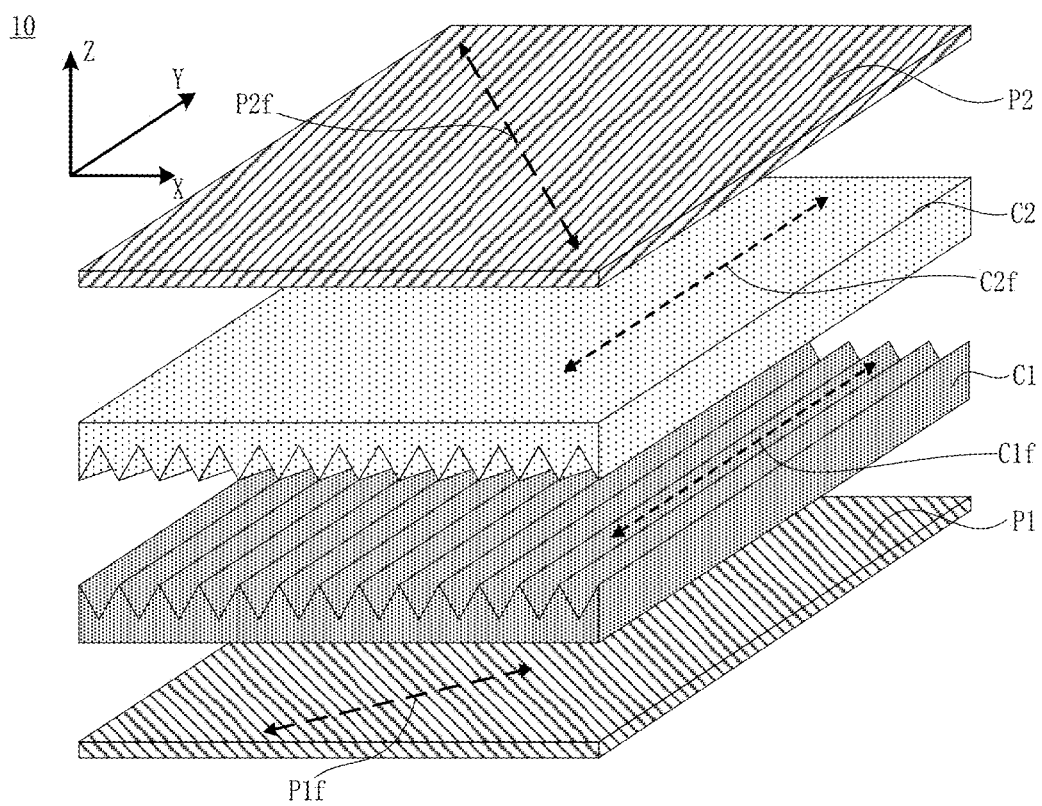
FIG. 5 is a partial schematic structural diagram of the display module shown in FIG. 3.
Figure 6:
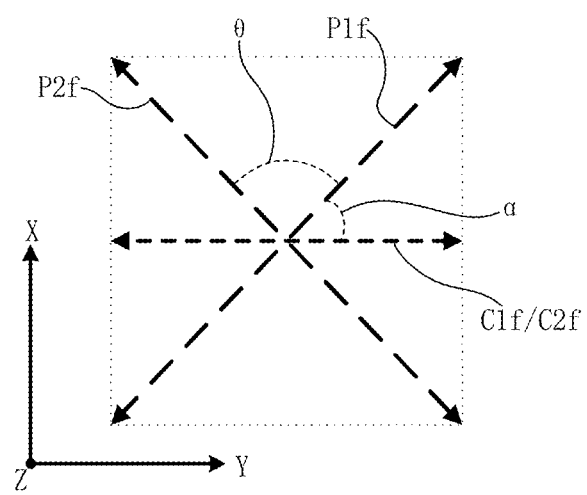
FIG. 6 is a schematic diagram showing a relationship between special property directions of respective structures shown in FIG. 5.

FIG. 5 is a partial schematic structural diagram of the display module shown in FIG. 3. FIG. 6 is a schematic diagram of a relationship between special property directions of respective structures shown in FIG. 5.

A first polarization axis P1$f$ of the first polarizer P1, a second polarization axis P2$f$ of the second polarizer P2, a first alignment axis C1$f$ of the first alignment layer C1, and a second alignment axis C2$f$ of the second alignment layer C2 are denoted in FIG. 5. An alignment direction of the first alignment layer C1 is the same as an extension direction of the first alignment axis C1$f$. An alignment direction of the second alignment layer C2 is the same as an extension direction of the second alignment axis C2$f$.

FIG. 6 shows an intersection or parallel relationship between the foregoing polarization axes and alignment axes along a positive direction of a third direction Z. A first direction X intersects and is perpendicular to a second direction Y. The third direction Z is perpendicular to a plane formed by the first direction X and the second direction Y. Both the first direction X and the second direction Y are parallel to a plane of the first light control panel D1. The third direction Z perpendicular to the plane of the first light control panel D1.

The first polarizer P1 converts the light emitted from the backlight plate L into linearly polarized light. After the linearly polarized light is incident to the first light control liquid crystal layer LC1, affected by a liquid crystal array, a polarization state and a propagation direction of the linearly polarized light are changed and thus the polarized light is emitted to the second polarizer P2. The second polarizer P2 is used to control a transmittance of the polarized light emitted from the first light control liquid crystal layer LC1. A polarization axis direction of the first polarizer P1 is perpendicular to a polarization axis direction of the second polarizer P2. For example, with reference to FIG. 5 and FIG. 6, an extension direction of a projection of the second polarization axis P2$f$ of the second polarizer P2 along the direction perpendicular to the plane of the first light control panel D1 intersects an extension direction of a projection of the first polarization axis P1$f$ of the first polarizer P1 along the direction perpendicular to the plane of the first light control panel D1, an angle between the two extension directions is θ, and θ=90°.

An alignment direction of an alignment layer in the first light control panel D1 determines an initial deflection direction of each of the liquid crystals in the first light control liquid crystal layer LC1. The initial deflection direction of each of the liquid crystals, combined with the first polarizer P1 and the second polarizer P2, can control a transmittance and a propagation direction of light passing through the first light control liquid crystal layer LC1 in an initial state. The alignment direction of the first alignment layer C1 is parallel to the alignment direction of the second alignment layer C2, and the alignment direction of the first alignment layer C1 intersects an extension direction of the first polarization axis P1$f$. For example, with reference to FIG. 4 and FIG. 5, the first alignment axis C1$f$ of the first alignment layer C1 is parallel to the second direction Y, and the second alignment axis C2$f$ of the second alignment layer C2 is parallel to the second direction Y. In this case, the first alignment axis C1$f$ is parallel to the second alignment axis C2$f$.

Similarly, an angle between an orthographic projection of the first alignment axis C1$f$ along the third direction (the Z direction) and an orthographic projection of the first polarization axis P1$f$ along the third direction (Z direction) is greater than α, and 90°>α>0°. In this case, an angle between the alignment direction of the first alignment layer C1 and a polarization axis of the first polarizer P1 is greater than 0° and less than 90°.

Figure 7:
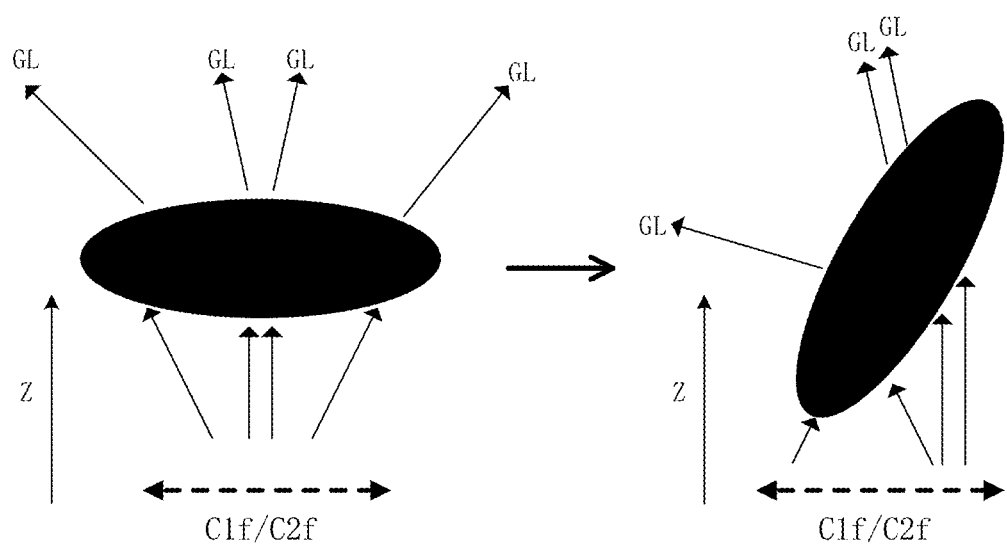
FIG. 7 is a schematic diagram showing impact of liquid crystals with different deflection angles on light.

FIG. 7 is a schematic diagram of impact of liquid crystals with different deflection angles on light.

When the first light control panel D1 is not powered on, a long axis of a liquid crystal in the first light control liquid crystal layer LC1 is parallel to the alignment direction of the first alignment layer C1 and is parallel to the alignment direction of the second alignment layer C2. In this case, after passing through the first polarizer P1, the light emitted from the backlight plate L becomes linearly polarized light, then passes through the first light control liquid crystal layer LC1 and then becomes elliptically polarized light and propagates to the second polarizer P2. When such light is emitted from the second polarizer P2, a polarization direction of the light is parallel to the polarization axis direction of the second polarizer P2.

With reference to the impact of liquid crystals on the left on light in FIGS. 3-5, and 7, because the long axis of each of the liquid crystals in the first light control liquid crystal layer LC1 is parallel to the alignment direction of the first alignment layer C1 and is parallel to the alignment direction of the second alignment layer C2, the short axis of each of the liquid crystals is perpendicular to the first light control panel D1. In this case, an angle between the short axis and the plane of the first light control panel D1 is greater than 0°, and light GL directed towards a light exit surface of the first light control panel D1 can be emitted from the first light control panel D1. In this case, the light emitted from the first light control panel D1 propagates towards the light exit surface of the first light control panel D1 and includes large-angle light. In this case, the display module can be in the sharing mode.

In an embodiment of the present disclosure, the display module can achieve displaying in the sharing mode when the first light control panel D1 is not powered on, such that power consumption can be reduced. In addition, compared with the conventional electronically controlled birefringent liquid crystal cell structure in which liquid crystals in the light control liquid crystal cell in the sharing mode are in a disordered state, the liquid crystals in the first light control panel D1 of the display module of the embodiment of the present disclosure are arranged in an orderly manner in the sharing mode, such that the color cast problem can be effectively alleviated.

With reference to impact of liquid crystals on the right on light in FIGS. 35, and 7, when the first light control panel D1 is powered on, the long axis of each of the liquid crystals in the first light control liquid crystal layer LC1 is no longer parallel to the alignment direction of the first alignment layer C1 and the alignment direction of the second alignment layer C2, and the liquid crystals are tilted up at a particular angle along the direction perpendicular to the surface of the first light control panel D1. In addition, different electric fields between the first electrode E1 and the second electrode E2 cause the liquid crystals to be tilted up at different angles. When the liquid crystals in the first light control liquid crystal layer LC1 are tilted up, because the light along a direction of the long axis of the liquid crystals cannot pass through the first light control liquid crystal layer LC1 and the light perpendicular to the direction of the long axis of the liquid crystals can pass through the first light control liquid crystal layer LC1, the powered-on first light control panel D1 can control an angle at which the light emitted from the backlight plate L exits from the first light control panel D1. In this way, anti-peeping can be achieved.

In an embodiment of the present disclosure, when the display module is in its anti-peeping mode, the liquid crystals are tilted up at a particular angle along the direction perpendicular to the surface of the first light control panel D1, such that the light with a particular propagation direction cannot be emitted from the first light control panel D1. Compared with the conventional electronically controlled birefringent liquid crystal cell structure, in which liquid crystals in the light control liquid crystal cell in the anti-peeping mode are deflected only in a plane parallel to the plane of the light control liquid crystal cell, and the light control liquid crystal cell can control only a transmittance of the light and thus makes it difficult to achieve that light of a particular direction cannot pass, the first light control panel D1 of the display module of the embodiments of the present disclosure can achieve more effective anti-peeping.

In an embodiment, the first electrode E1 and the second electrode E2 may be continuously arranged over the entire surface. For example, both the first electrode E1 and the second electrode E2 are transparent conductive electrodes continuously arranged over the entire surface.

In an embodiment of the present disclosure, display modes of the display module 10 include a first display mode and a second display mode. An anti-peeping function of the display module 10 is disabled in the first mode and is enabled in the second mode. In this case, a maximum light exit angle of the display module 10 in the first display mode is greater than a maximum light exit angle of the display module 10 in the second display mode. A light exit angle is a readable observation viewing angle of a display screen. In this observation viewing angle, the display screen can be effectively read. The maximum light exit angle represents a maximum observation angle of the display screen that can be read. When the observation viewing angle is greater than the maximum light exit angle, an observer cannot effectively read the display screen.

Figure 8:
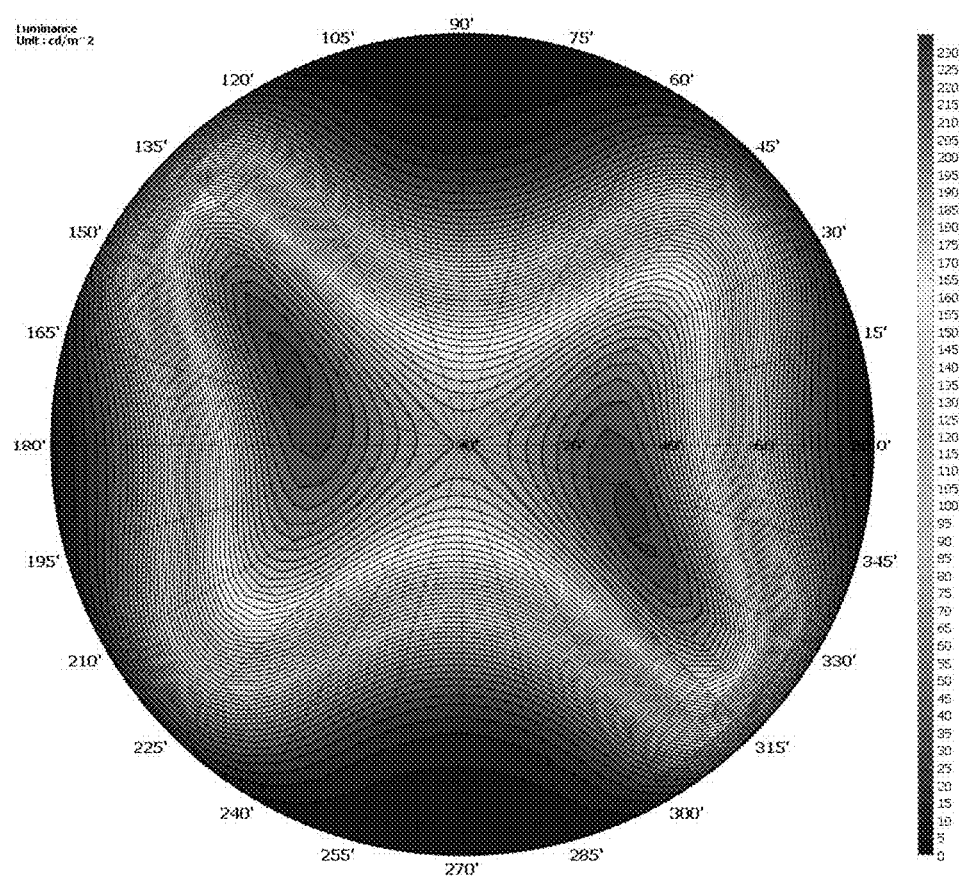
FIG. 8 is a brightness diagram of a display module according to an embodiment of the present disclosure at different viewing angles in a first display mode.
Figure 9:
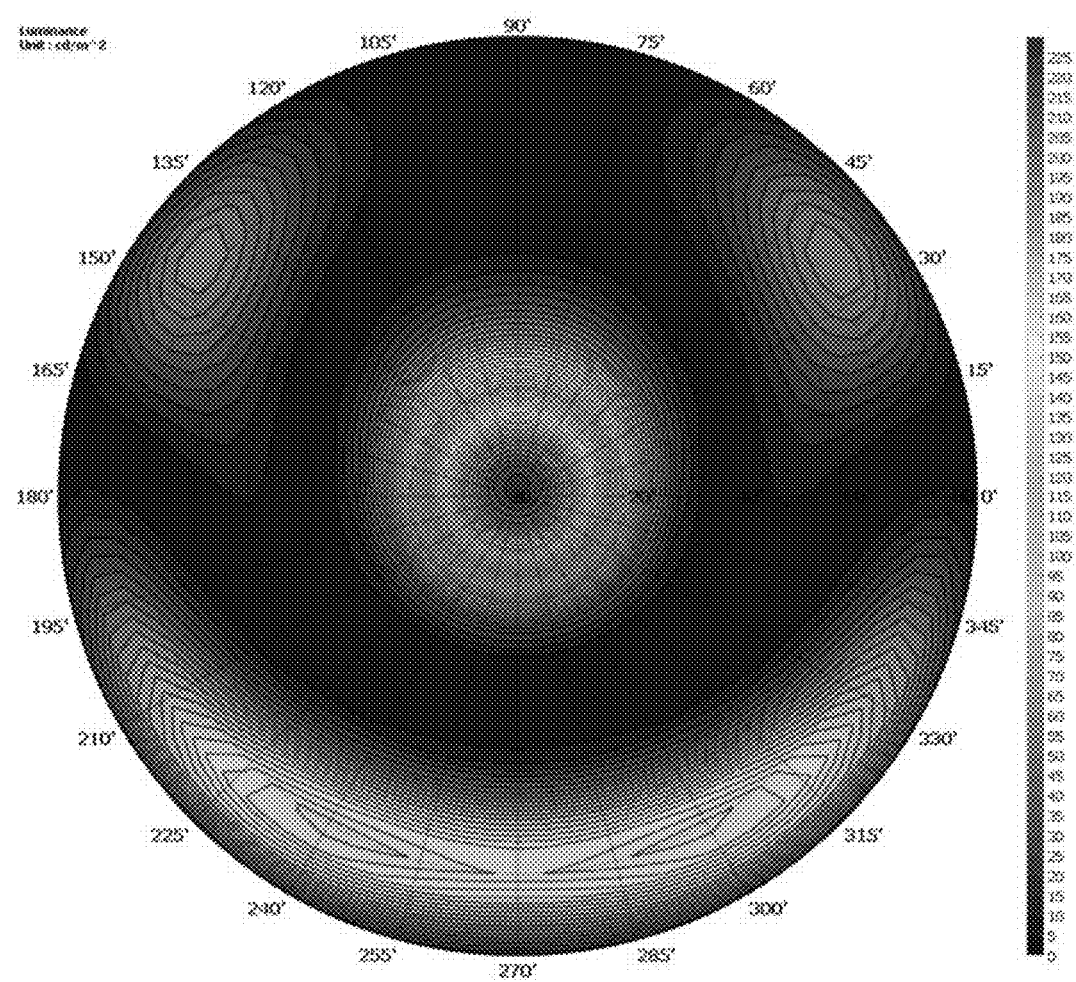
FIG. 9 is a brightness diagram of a display module according to an embodiment of the present disclosure at different viewing angles in a second display mode.

FIG. 8 is a brightness diagram of a display module according to an embodiment of the present disclosure at different viewing angles in a first display mode. FIG. 9 is a brightness diagram of a display module according to an embodiment of the present disclosure at different viewing angles in a second display mode.

The display module corresponding to FIG. 8 and FIG. 9 includes a first light control panel D1. It can be seen through comparison between FIG. 8 and FIG. 9 that, when the display module 10 includes one light control panel, that is, includes only the first light control panel D1, the display module 10 can achieve effective anti-peeping at one side.

In the first display mode, the display panel DP performs display, and the long axis of each of the liquid crystals in the first light control liquid crystal layer LC1 is parallel to the alignment direction of the first alignment layer C1. That is, the first light control liquid crystal layer LC1 in the first light control panel D1 maintains the initial state. The liquid crystals in the first light control panel D1 is not deflected, as shown on the left of FIG. 7. That is, the display module is in the sharing mode.

In an embodiment, at least one of the first electrode E1 and the second electrode E2 does not receive a voltage signal. Alternatively, the first electrode E1 and the second electrode E2 have a same potential. In this case, an electric field that causes deflection of the liquid crystal in the first light control liquid crystal layer LC1 cannot be generated between the first electrode E1 and the second electrode E2.

In the second display mode, the display panel DP performs display, and the first electrode E1 and the second electrode E2 receive respective different voltage signals to control the liquid crystal in the first light control liquid crystal layer LC1 to be deflected, as the liquid crystal on the right shown in FIG. 7. That is, the display module is in the anti-peeping mode.

In an embodiment of the present disclosure, the first display mode and the second display mode are configured such that the display module 10 can be switched between a state in which anti-peeping is enabled and a state in which anti-peeping is disabled, thereby improving the flexibility of anti-peeping display and achieving the anti-peeping effect.

In an embodiment of the present disclosure, in the second display mode, the first electrode E1 and the second electrode E2 receive respective different voltage signals, and an electric field is formed therebetween, to control the liquid crystals in the first light control liquid crystal layer to be deflected. In the first mode, an angle between a direction of a long axis of each of the deflected liquid crystals and a plane of the first substrate S1 is greater than or equal to 40°, and less than or equal to 80°. In this way, the luminous brightness of the display module can be assured and a favorable anti-peeping effect can be achieved.

In an embodiment, in the first mode, the angle between the direction of the long axis of each of the deflected liquid crystals and the plane of the first substrate S1 is 60°.

In an embodiment of the present disclosure, $80° \geq \alpha \geq 30°$. That is, the angle $\alpha$ between the orthographic projection of the first alignment axis C1f along the third direction Z and the orthographic projection of the first polarization axis P1f along the third direction Z is greater than or equal to 30°, and less than or equal to 80°.

Regarding the structural display and anti-peeping principle of the structures of the display module according to the embodiments of the present disclosure, when $\alpha$ is relatively small, after the linearly polarized light emitted from the first polarizer P1 is emitted from the first light control liquid crystal layer LC1 and then converted from the linearly polarized light into elliptically polarized light, there is a relatively small amount of light with a polarization direction parallel to the second polarization axis P2f in the elliptically polarized light. In this case, ultimately, there is a relatively small amount of light emitted from the first light control panel D1, such that the brightness of the display module is relatively low. Therefore, the display effect of the display module in the sharing mode may be relatively poor. When $\alpha$ is relatively large, after the linearly polarized light emitted from the first polarizer P1 is emitted from the first light control liquid crystal layer LC1 and then converted from the linearly polarized light into elliptically polarized light, there is a relatively large amount of light with a polarization direction parallel to the second polarization axis P2f in the elliptically polarized light. In this case, ultimately, there is a relatively large amount of light emitted from the first light control panel D1, such that the brightness of the display module is relatively high. In this case, the display module will have relatively high display brightness and correspondingly a worse anti-peeping effect. Through a large number of simulations, it can be known that when $\alpha$ is greater than or equal to 30°, and less than or equal to 80°, the display module can have both a favorable display effect in the sharing mode and a favorable anti-peeping effect in the anti-peeping mode.

In an embodiment of the present disclosure, $\alpha=45°$, that is, the angle $\alpha$ between the projection of the first alignment axis C1f along the third direction Z and the projection of the first polarization axis P1f along the third direction Z is equal to 45°. In this case, the display module can have both a better display effect in the sharing mode and a better anti-peeping effect in the anti-peeping mode.

In an embodiment of the present disclosure, as shown in FIG. 3 and FIG. 4, a birefringence of the liquid crystal included in the first light control liquid crystal layer LC1 is Δn. A thickness of the first light control liquid crystal layer LC1 along the direction perpendicular to the surface of the first light control panel D1 is d. 820 nm≥(Δn*d)≥700 nm, that is, an optical path difference of the first light control liquid crystal layer LC1 is greater than or equal to 700 nm, and less than or equal to 820 nm.

A change range of a polarization direction of polarized light in the first light control liquid crystal layer LC1 is affected by the optical path difference ΔL, and ΔL=Δn*d. When 820 nm≥ΔL≥700 nm, light with a light mount closer to a preset light amount can pass through the second polarizer P2, such that a transmittance of the polarized light in the first light control panel D1 is improved.

Figure 10:
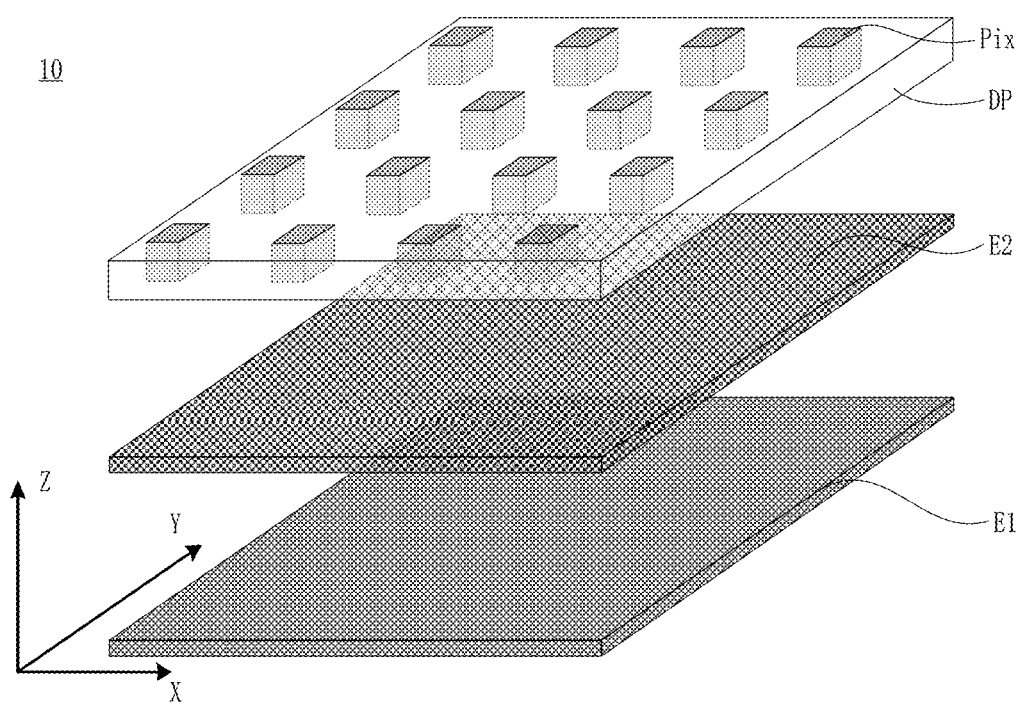
FIG. 10 is a partial schematic structural diagram of a display module according to the present disclosure.
Figure 11:
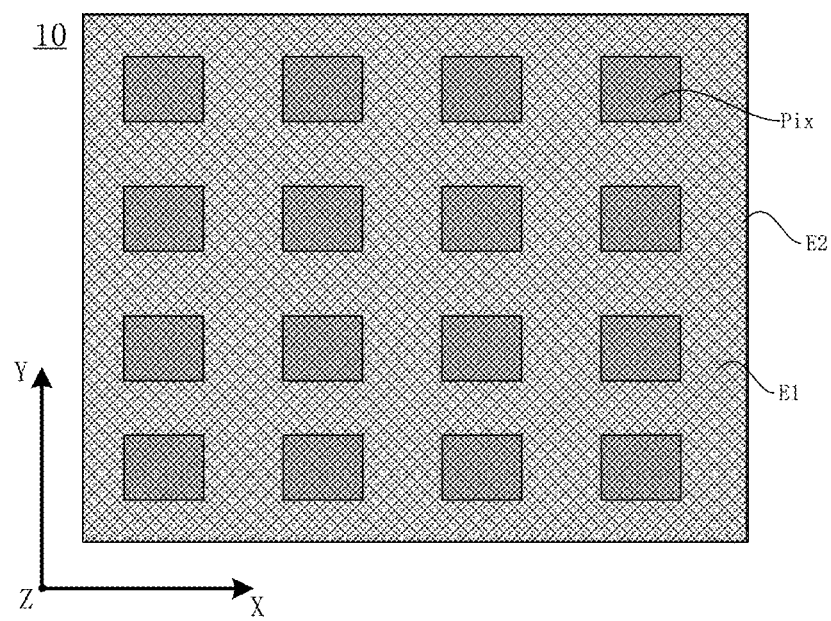
FIG. 11 is a partial structural bottom view of the display module shown in FIG. 10.

FIG. 10 is a partial schematic structural diagram of a display module according to the present disclosure. FIG. 11 is a partial structural bottom view of the display module shown in FIG. 10.

In an embodiment of the present disclosure, with reference to FIG. 10 and FIG. 11, the display panel DP includes a plurality of subpixels Pix. Along the direction (the third direction Z) perpendicular to the surface of the display panel DP, both the first electrode E1 and the second electrode E2 overlap the subpixels Pix. A quantity of subpixels Pix overlapping one first electrode E1 is equal to a quantity of subpixels Pix overlapping one second electrode E2.

In this embodiment of the present disclosure, the quantity of subpixels Pix overlapping one first electrode E1 is equal to the quantity of subpixels Pix overlapping one second electrode E2. The strength of electric fields between different first electrodes E1 and the respective second electrodes E2 may remain consistent, such that the anti-peeping strength in different regions of the display module 10 are the same. Alternatively, the strengths of electric fields between different first electrodes E1 and corresponding second electrodes E2 may be different, such that anti-peeping strengths of different regions of the display module 10 can be designed differently. In addition, the first electrode E1 and the second electrode E2 may have a same area and can be prepared through a same manufacturing process to reduce costs and preparation difficulty.

Figure 12:
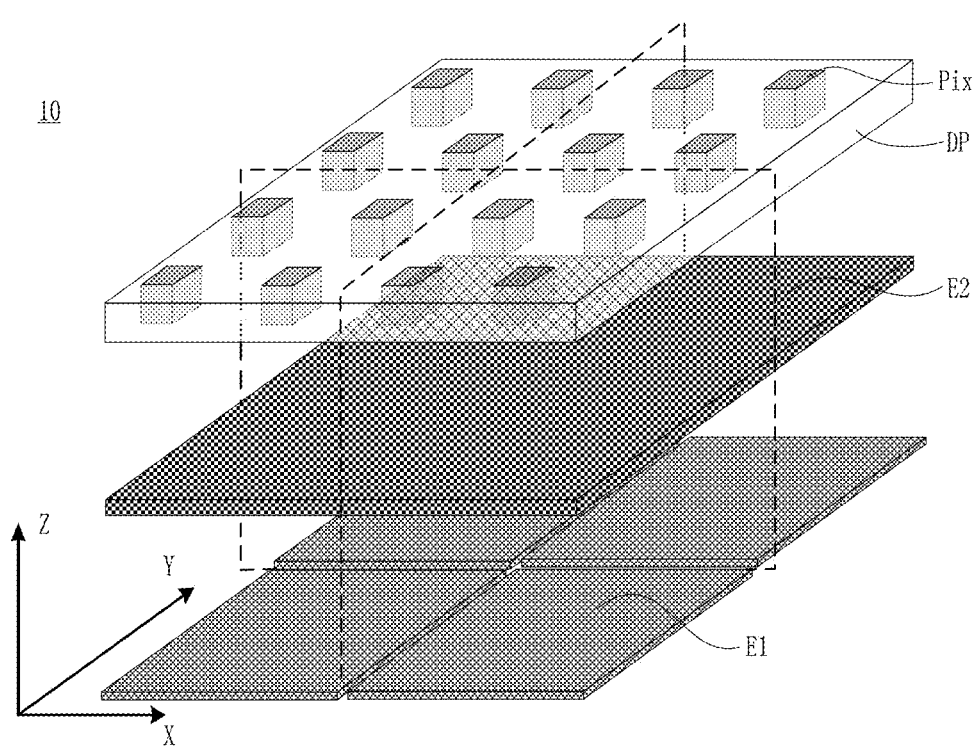
FIG. 12 is a partial schematic structural diagram of a display module according to the present disclosure.
Figure 13:
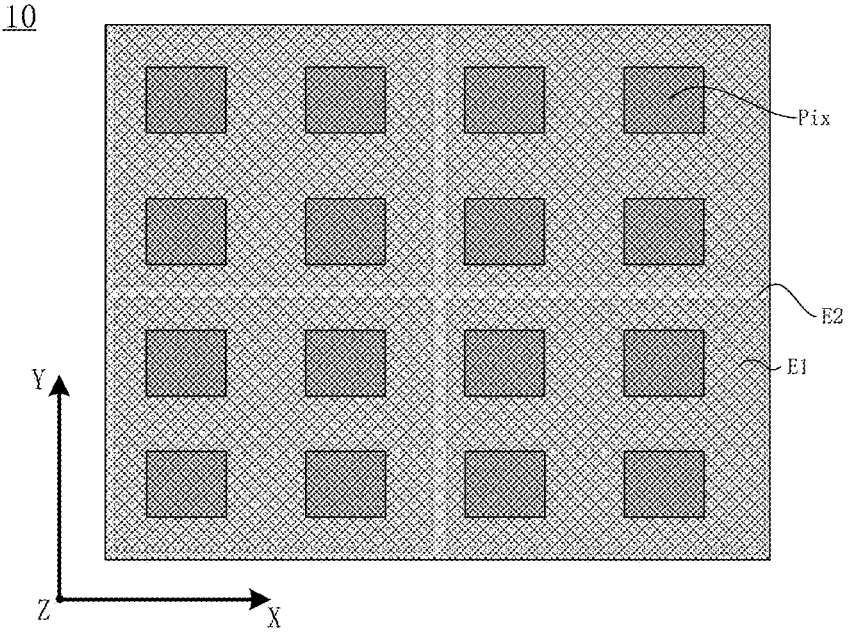
FIG. 13 is a partial structural bottom view of the display module shown in FIG. 12.

FIG. 12 is a partial schematic structural diagram of a display module according to the present disclosure. FIG. 13 is a partial structural bottom view of the display module shown in FIG. 12.

In an embodiment of the present disclosure, the display panel DP includes a plurality of subpixels Pix. Along the direction perpendicular to the surface of the display panel DP, the first electrode E1, the second electrode E2, and the subpixels Pix overlap one another. One second electrode E2 overlaps at least two first electrodes E1, and a quantity of subpixels overlapping one first electrode E1 is less than a quantity of subpixels overlapping one second electrode E2.

For example, with reference to FIG. 12 and FIG. 13, along the direction perpendicular to the surface of the display panel DP, the second electrode E2 overlaps four first electrodes E1, one second electrode E2 overlaps 16 subpixels Pix within the display panel DP, and four first electrodes E1 overlap four subpixels Pix. In this case, the quantity of subpixels overlapping one first electrode E1 is less than the quantity of subpixels overlapping one second electrode E2.

In an embodiment of the present disclosure, the quantity of the first electrodes E1 is greater than the quantity of the second electrodes E2. In this case, each of the first electrode E1 can receive a respective electrical signal. Therefore, the electrical signal received by the first electrode E1 can be adjusted according to the requirement of the anti-peeping viewing angle, such that anti-peeping of different degrees and different anti-peeping viewing angles can be achieved.

In an embodiment of the present disclosure, along the direction perpendicular to the surface of the display panel DP, a second electrode E2 covers all first electrodes E1. For example, with reference to FIG. 12 and FIG. 13, along the direction perpendicular to the surface of the display panel DP, one second electrode E2 covers all the four first electrodes E1.

In an embodiment of the present disclosure, one second electrode E2 can form a plurality of electric fields having different electric field strengths with a plurality of first electrodes E1. In this case, the respective regions of the display panel that correspond to the first electrodes E1 can achieve anti-peeping at different angles. In addition, the first electrode E1 can be arranged over the entire surface without undergoing an etching process, thereby reducing preparation costs, wiring difficulty, and the like.

Figure 14:
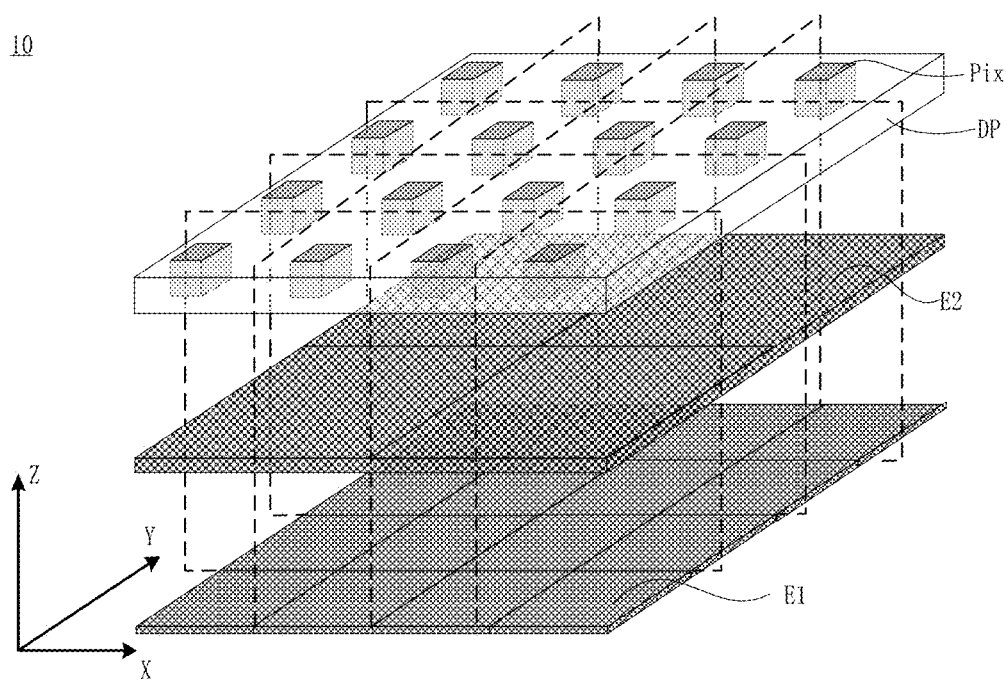
FIG. 14 is a partial schematic structural diagram of a display module according to the present disclosure.
Figure 15:
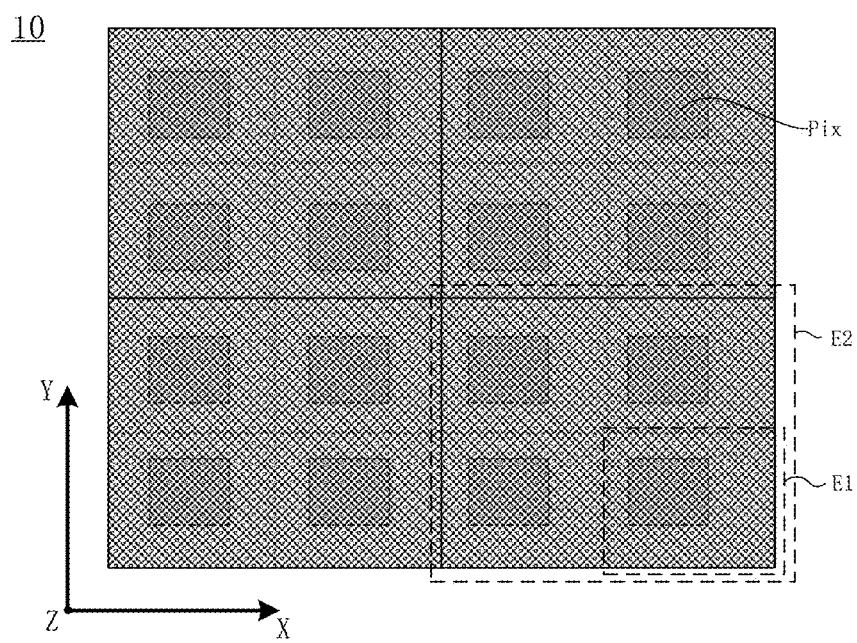
FIG. 15 is a partial structural bottom view of the display module shown in FIG. 14.

FIG. 14 is a partial schematic structural diagram of a display module according to the present disclosure. FIG. 15 is a partial structural bottom view of the display module shown in FIG. 14.

In an embodiment of the present disclosure, with reference to FIG. 14 and FIG. 15, along the direction perpendicular to the surface of the display panel DP, one first electrode E1 overlaps one subpixel Pix.

In an embodiment of the present disclosure, an electric field generated by one first electrode E1 and a second electrode E2 controls only a region of the first light control liquid crystal layer LC1 corresponding to one subpixel Pix, such that deflection angles of liquid crystals that respectively and correspondingly overlap a plurality of subpixels Pix can be respectively controllable, and more accurate anti-peeping can be achieved.

When the first light control panel D1 includes a plurality of first electrodes E1, at least two of the first electrodes E1 receive different electrical signals, and electric fields with difference electric field strengths are generated by the at least two first electrodes E1 and the second electrode E2, and controls the liquid crystals within the regions corresponding to the at least two the first electrode E1, respectively, to be deflected at different angles, such that the light exit surface of the display panel DP emits, corresponding to the regions respectively corresponding to the at least two first electrodes E1, display light within different exit viewing angle ranges, which is applicable to a case that different display regions require different anti-peeping angles.

For example, the display module 10 includes a first region and a second region, and the first region and the second region are provided with an electrically insulated first electrode E1, respectively. When a voltage received by the first electrode E1 in the first region can be greater than a voltage received by the first electrode E1 in the second region, a strength of an electric field between the first electrode E1 in the first region and the second electrode E2 is greater than a strength of an electric field between the first electrode E1 in the second region and the second electrode E2. Therefore, a deflection angle of the liquid crystals arranged in the first region is greater than a deflection angle of the liquid crystals in the second region in the first light control liquid crystal layer LC1, such that a light exit angle range of the first region of the display module 10 is less than a light exit angle range of the second region thereof. In this case, the first region of the display module 10 can achieve anti-peeping at a relatively small viewing angle, while the second region of the display module 10 can achieve anti-peeping at a relatively large viewing angle. The first region may be closer to an edge of the display module than the second region.

Figure 16:
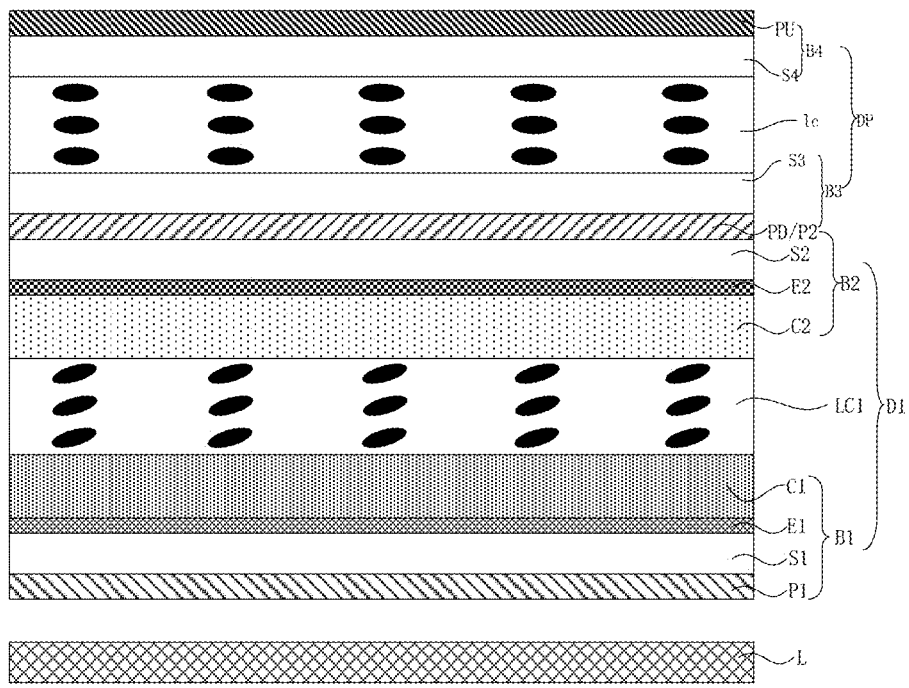
FIG. 16 is a partial schematic structural diagram of a display module according to the present disclosure.

FIG. 16 is a partial schematic structural diagram of a display module according to the present disclosure.

The display panel DP includes a third base B3, a fourth base B4, and a display liquid crystal layer lc. As shown in FIG. 16, the third base B3 and the fourth base B4 are arranged opposite to each other, and the display liquid crystal layer lc is arranged between the third base B3 and the fourth base B4. The third base B3 includes a third substrate S3, and the fourth base B4 includes a fourth substrate S4. The third base B3 is arranged between the fourth base B4 and the first light control panel D1. The second base B2 is arranged between the first base B1 and the display panel DP. That is, the third base B3 is closer to the first light control panel D1 than the fourth base B4, and the second base B2 is closer to the display panel DP than the first base B1.

A top polarizer PU and a bottom polarizer PD need to be arranged at two sides of the display liquid crystal layer lc, respectively. In an embodiment, the fourth base B4 may include the top polarizer PU, and the third base B3 may include the bottom polarizer PD. The second polarizer P2 in the first light control panel D1 is arranged between the second substrate S2 and the third substrate S3. In this case, the second polarizer P2 may be reused as the bottom polarizer PD.

The second polarizer P2 may be attached to the second substrate S2, or the second polarizer P2 may be attached to the third substrate S3.

In an embodiment of the present disclosure, the second polarizer P2 is reused as polarizers in the display panel DP and the first light control panel D1, such that a thickness of the display module 10 is attenuated, and a quantity of the used polarizers is reduced, thereby reducing process costs. The second polarizer P2 is arranged fitted to the second substrate S2 or the third substrate S3, thereby reducing the degree of displacement between the polarizer and the substrate.

When the display panel DP includes the display liquid crystal layer lc, the display panel further includes an alignment layer, which is not shown in the figure.

It should be noted that, in some embodiments, alternatively, the display panel DP and the first light control panel D1 may not reuse the polarizer. That is, the bottom polarizer PD and the second polarizer P2 are different polarizers.

Figure 17:
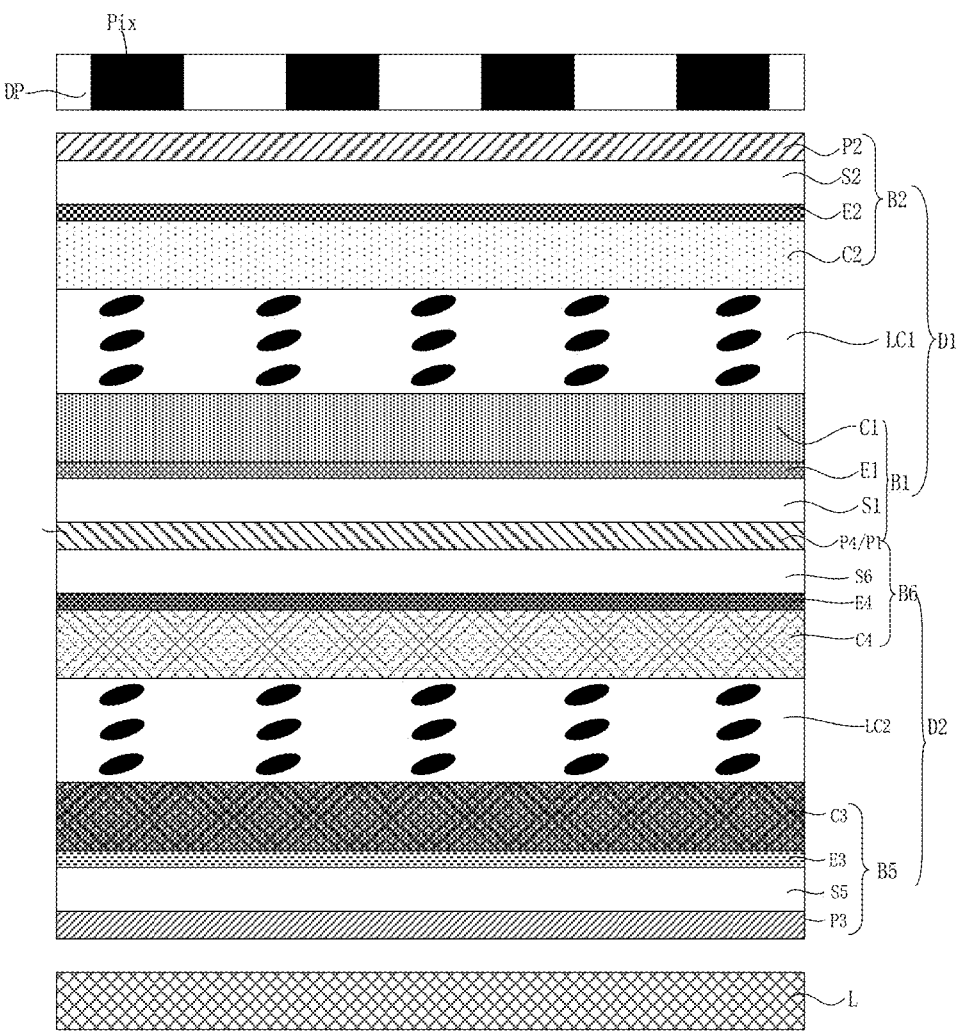
FIG. 17 is a partial schematic structural diagram of a display module according to an embodiment of the present disclosure.
Figure 18:
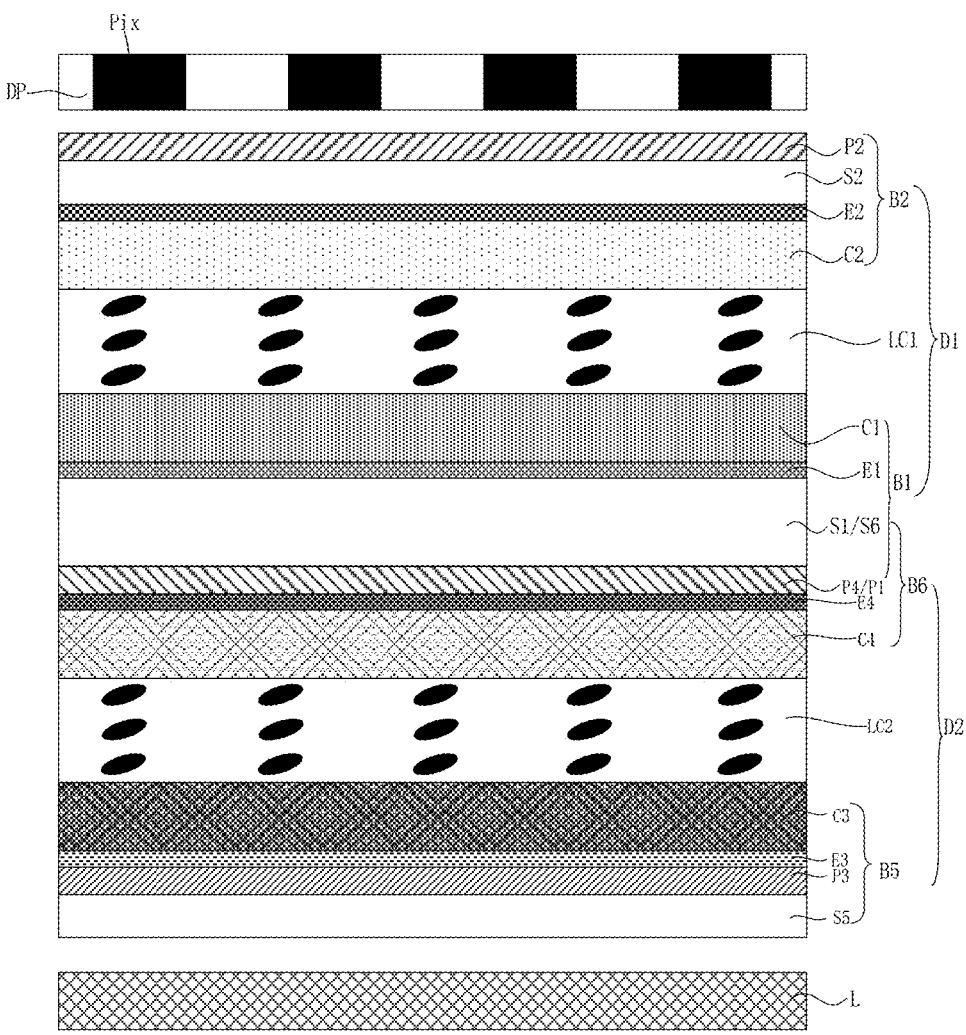
FIG. 18 is a partial schematic structural diagram of a display module according to an embodiment of the present disclosure.

FIG. 17 is a partial schematic structural diagram of a display module according to an embodiment of the present disclosure. FIG. 18 is a partial schematic structural diagram of a display module according to an embodiment of the present disclosure.

In an embodiment of the present disclosure, as shown in FIG. 17 and FIG. 18, the display module 10 further includes a second light control panel D2. As shown in FIG. 17 and FIG. 18, the second light control panel D2 is arranged at a side of the first light control panel D1 away from the display panel DP. For example, the second light control panel D2 is arranged at a side of the backlight plate L facing the display panel DP. The second light control panel D2 includes a fifth base B5, a sixth base B6, and a second light control liquid crystal layer LC2. The fifth base B5 and the sixth base B6 are arranged opposite to each other, and the second light control liquid crystal layer LC2 is arranged between the fifth base B5 and the sixth base B6.

The fifth base B5 includes a fifth substrate S5, a third electrode E3, a third alignment layer C3, and a third polarizer P3. The third electrode E3 and the third alignment layer C3 are arranged at a side of the fifth substrate S5 facing the second light control liquid crystal layer LC2. The third electrode E3 may be arranged between the fifth substrate S5 and the third alignment layer C3. The third polarizer P3 is arranged at a side of the fifth substrate S5. For example, as shown in FIG. 17, the third polarizer P3 is arranged at a side of the fifth substrate S5 facing the backlight plate L. Alternatively, as shown in FIG. 18, the third polarizer P3 is arranged at a side of the fifth substrate S5 facing the second light control liquid crystal layer LC2.

The sixth base B6 includes a sixth substrate S6, a fourth electrode E4, a fourth alignment layer C4, and a fourth polarizer P4. The fourth electrode E4 and the fourth alignment layer C4 are arranged at a side of the sixth substrate S6 facing the second light control liquid crystal layer LC2. The fourth electrode E4 may be arranged between the sixth substrate S6 and the fourth alignment layer C4. The fourth polarizer P4 is arranged at a side of the sixth substrate S6. For example, as shown in FIG. 18, the fourth polarizer P4 is arranged at a side of the sixth substrate S6 facing the second light control liquid crystal layer LC2. Alternatively, as shown in FIG. 17, the fourth polarizer P4 is arranged at a side of the sixth substrate S6 facing the first light control liquid crystal layer LC1.

It should be noted that, when the third polarizer P2 is arranged at the side of the fifth substrate S5 facing the second light control liquid crystal layer LC2, the third polarizer P3 may be a metal grating deposited on the fifth substrate S5. When the fourth polarizer P4 is arranged at the side of the sixth substrate S6 facing the second light control liquid crystal layer LC2, the fourth polarizer P4 may also be a metal grating deposited on the sixth substrate S6. When the third polarizer P3 is arranged at the side of the fifth substrate S5 facing the backlight plate L, the third polarizer P3 may be a polarizer attached to the fifth substrate S5, or may be a metal grating deposited on the third substrate S3. When the fourth polarizer P4 is arranged at the side of the sixth substrate S6 facing the first light control panel D1, the fourth polarizer P4 may be a polarizer attached to the sixth substrate S6, or may be a metal grating deposited on the sixth substrate S6.

Figure 19:
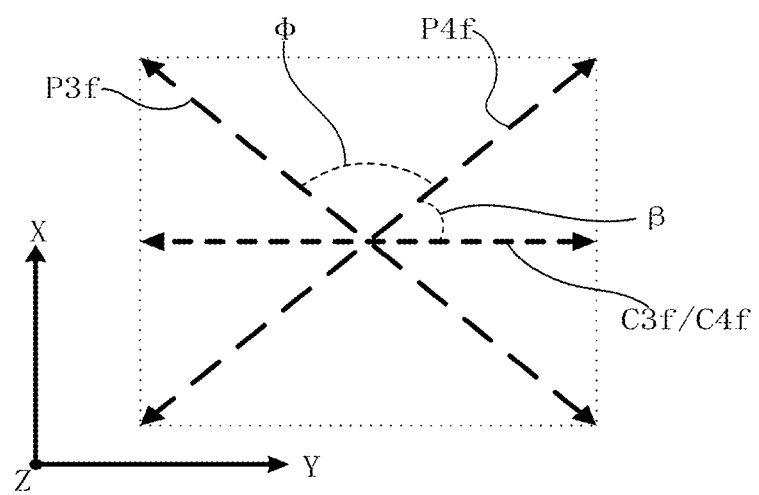
FIG. 19 is a schematic diagram showing a relationship between special property directions of respective structures shown in FIG. 5.

FIG. 19 is a schematic diagram of a relationship between special property directions of respective structures shown in FIG. 5.

A third polarization axis P3f of the third polarizer P3, a fourth polarization axis P4f of the fourth polarizer P4, a third alignment axis C3f of the third alignment layer C3, and a fourth alignment axis C4f of the fourth alignment layer C4 are denoted in FIG. 19. An alignment direction of the third alignment layer C3 is the same as an extension direction of the third alignment axis C3f. An alignment direction of the fourth alignment layer C4 is the same as an extension direction of the fourth alignment axis C4f. That is, the alignment direction of the third alignment layer C3 is parallel to the alignment direction of the fourth alignment layer C4.

An extension direction of the third polarization axis P3f of the third polarizer P3 intersects an extension direction of the fourth polarization axis P4f of the fourth polarizer P4, an angle therebetween is φ, and φ=90°. That is, a polarization axis direction of the third polarizer P3 is perpendicular to a polarization axis direction of the fourth polarizer P4.

In an embodiment of the present disclosure, the alignment direction of the third alignment layer C3 intersects the extension direction of the fourth polarization axis P4f. For example, with reference to FIG. 17, the third alignment axis C3f of the third alignment layer C3 is parallel to the second direction Y, and the fourth alignment axis C4f of the fourth alignment layer C4 is parallel to the second direction Y. In this case, the third alignment axis C3f is parallel to the fourth alignment axis C4f. In addition, an angle between a projection of the third alignment axis C3f along the third direction Z and a projection of the fourth polarization axis P4f along the third direction Z is β, and 90°>β>0°.

The principle by which the second light control panel D2 controls the display module to achieve display in the anti-peeping mode and the sharing mode is the same as that of the first light control panel D1, which will not be described herein in detail again. In this embodiment, both the first light control panel D1 and the second light control panel D2 are arranged in the display module, such that the anti-peeping effect of the display module can be better.

In an embodiment of the present disclosure, as shown in FIG. 17 and FIG. 18, the sixth base B6 and the first base B1 are arranged at a same side of the fifth base B5, and the sixth base B6 is arranged between the fifth base B5 and the first base B1. In this case, the first base B1 and the sixth base B6 that are arranged adjacent to each other in the display module 10 share a same polarizer. As shown in FIG. 17 and FIG. 18, the first polarizer P1 may be reused as the fourth polarizer P4. The first polarizer P1 is attached to the first substrate S1. Alternatively, the first polarizer P1 is attached to the sixth substrate S6.

In an embodiment of the present disclosure, the first polarizer P1 is reused as the fourth polarizer P4, such that a quantity of arranged polarizers can be reduced, the thickness of the display module 10 can be attenuated, and the process costs can be reduced. The first polarizer P1 is attached to the first substrate S1 or the sixth substrate S6, such that a degree of displacement of the first polarizer P1 in the display module 10 is reduced, thereby preventing the propagation direction of light from deviating between different structures in the display module 10, and improving anti-peeping performance.

In an embodiment of the present disclosure, as shown in FIG. 18, the first base B1 is arranged between the sixth base B6 and the second base B2, and the first substrate S1 of the first base B1 may be reused as the sixth substrate S6 of the sixth base B6. That is, the first base B1 and the sixth base B6 that are arranged adjacent to each other in the display module 10 may share the same substrate. In this embodiment, the first base B1 and the sixth base B6 reuse the same substrate, such that process costs are reduced and the thickness of the display module 10 is attenuated.

In an embodiment, as shown in FIG. 18, the first polarizer P1 may be reused as the fourth polarizer P4. That is, the first base B1 and the sixth base B6 reuse a same substrate and a same polarizer, such that process costs can be further reduced, and the thickness of the display module 10 can be attenuated.

Figure 20:
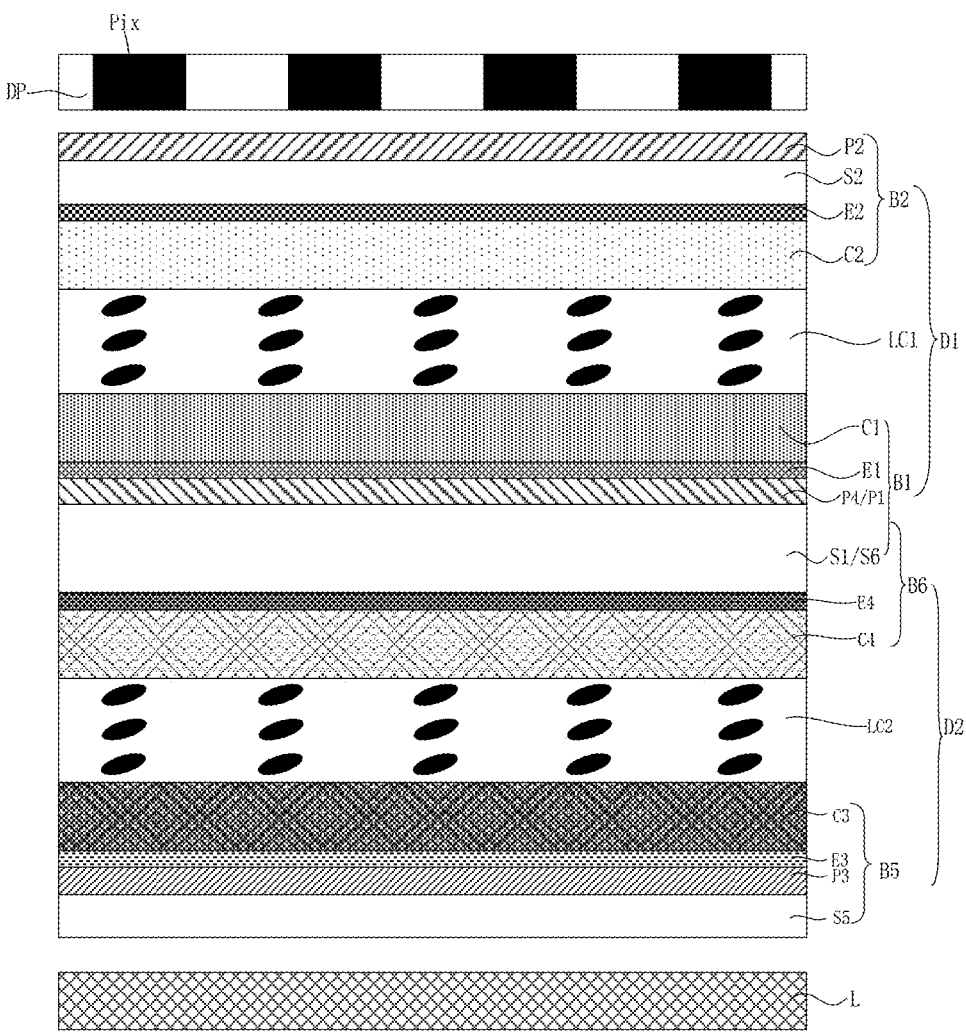
FIG. 20 is a partial schematic structural diagram of a display module according to an embodiment of the present disclosure.

FIG. 20 is a partial schematic structural diagram of a display module according to an embodiment of the present disclosure.

In an embodiment, as shown in FIG. 18, the first polarizer P1 reused as the fourth polarizer P4 may include a metal grating provided at a side of the first substrate S1 facing the sixth base B6. That is, the first polarizer P1 may be arranged at a side of the first substrate S1 facing the second light control liquid crystal layer LC2.

In an embodiment, as shown in FIG. 20, the first polarizer P1 reused as the fourth polarizer P4 may include a metal grating provided at a side of the first substrate S1 facing the first base B1. That is, the first polarizer P1 may be arranged at a side of the first substrate S1 facing the first light control liquid crystal layer LC1.

The first polarizer P1 is configured to be the metal grating provided at a side of the first substrate S1, such that the first polarizer P1 can use a same process as a signal line on the first substrate S1 does, thereby reducing costs without increasing the difficulty of the process.

It should be noted that, in some embodiments, the first light control panel D1 and the second light control panel D2 may alternatively not share a polarizer. That is, the first polarizer P1 and the fourth polarizer P4 are different from each other.

It should be noted that, in some embodiments, the first light control panel D1 and the second light control panel D2 may alternatively not share a substrate. That is, the first substrate S1 and the sixth substrate S6 are different from each other.

Figure 21:
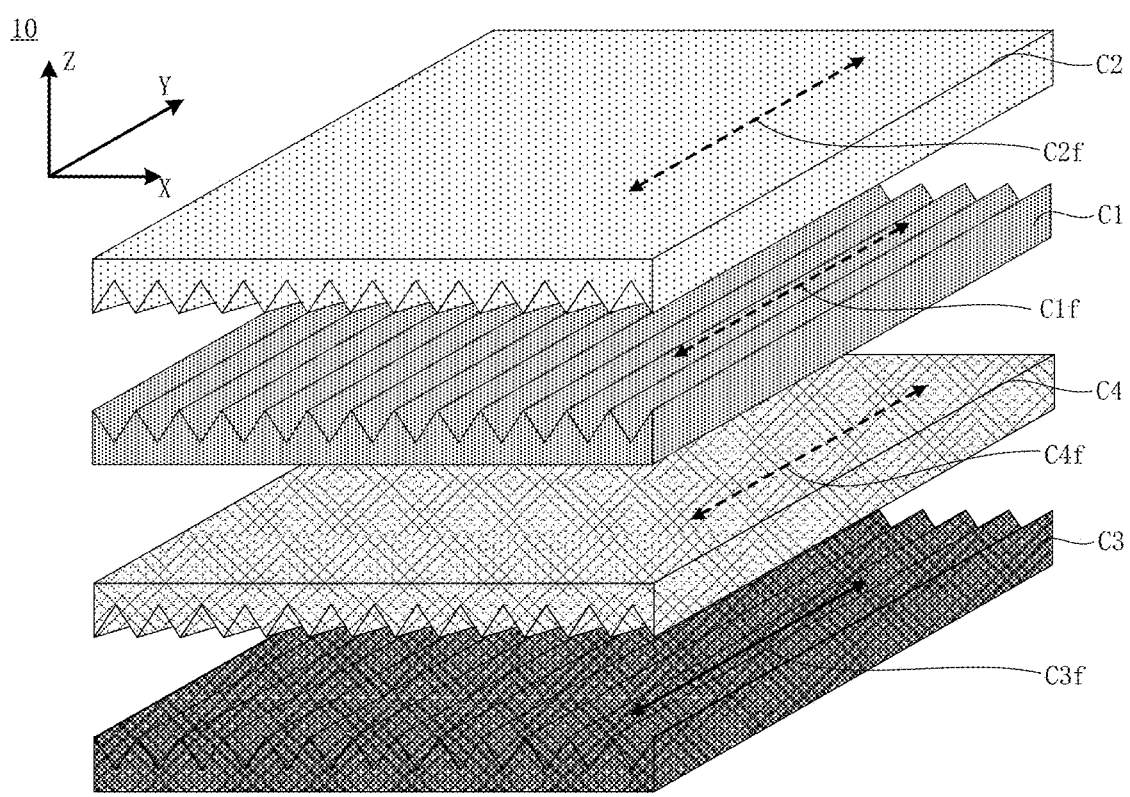
FIG. 21 is a partial schematic structural diagram of the display module shown in FIG. 20.

FIG. 21 is a partial schematic structural diagram of the display module shown in FIG. 20.

In an embodiment of the present disclosure, the alignment direction of the first alignment layer C1 is parallel to the alignment direction of the third alignment layer. For example, with reference to FIG. 21 and FIG. 22, the alignment direction of the third alignment layer C3 is the third alignment axis C3f, and the alignment direction of the fourth alignment layer C4 is the fourth alignment axis C4f. The first alignment axis C1f, the second alignment axis C2f, the third alignment axis C3f, and the fourth alignment axis C4f are all parallel to the second direction Y. In this case, the first alignment axis C1f, the second alignment axis C2f, the third alignment axis C3f, and the fourth alignment axis C4f are parallel to each other.

In an embodiment of the present disclosure, the first alignment axis C1f is parallel to the second alignment axis C2f. In this case, a deflection direction of the liquid crystals in the first light control liquid crystal layer LC1 and a deflection direction of the liquid crystals in the second light control liquid crystal layer LC2 are in a same plane.

In an embodiment, the deflection directions of the liquid crystals in the first light control liquid crystal layer LC1 is the same as the second light control liquid crystal layer LC2, and an angle at which the first light control liquid crystal layer LC1 achieves anti-peeping is the same as an angle at which the second light control liquid crystal layer LC2 achieves anti-peeping. In this case, an anti-peeping effect for a same viewing angle can be better.

Figure 22:
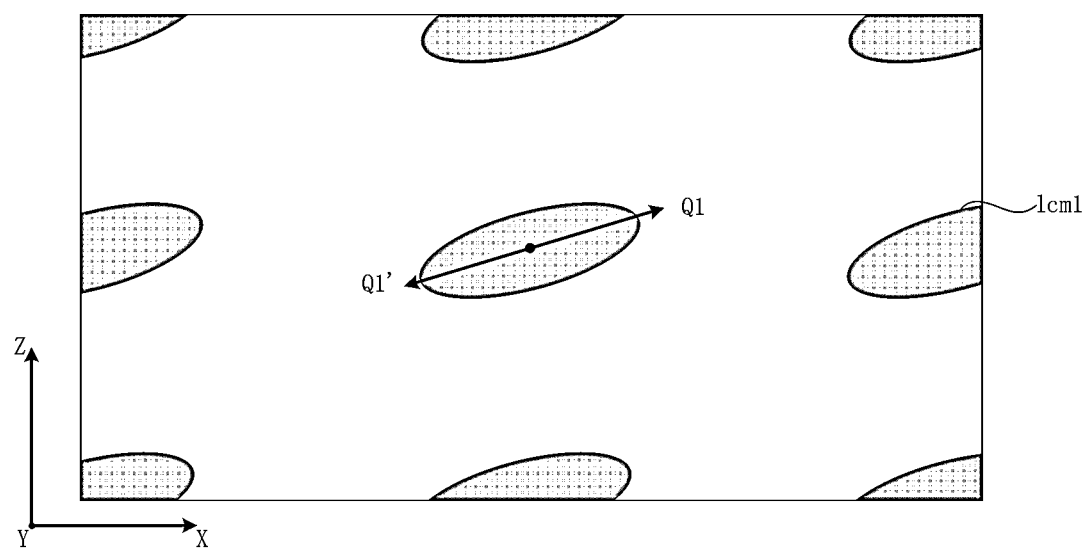
FIG. 22 is a partial schematic diagram of a first light control liquid crystal layer.
Figure 23:
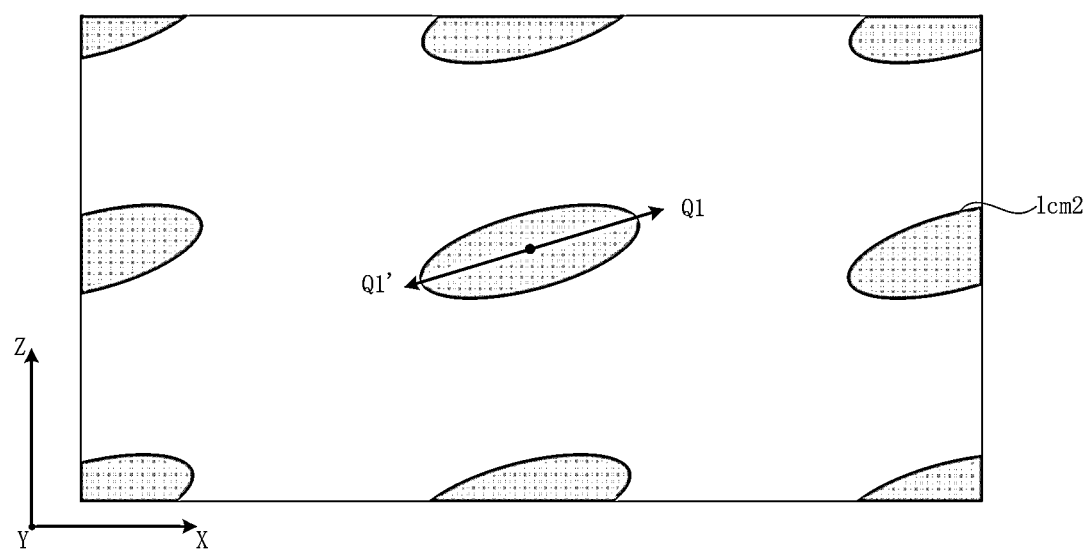
FIG. 23 is a partial schematic diagram of a first light control liquid crystal layer.

FIG. 22 is a partial schematic diagram of a first light control liquid crystal layer. FIG. 23 is a partial schematic diagram of a first light control liquid crystal layer.

In an embodiment, comparing FIG. 22 and FIG. 23, a pretilt direction of the liquid crystals in the first light control liquid crystal layer LC1 is parallel to a pretilt direction of the liquid crystals in the second light control liquid crystal layer LC2, so as to ensure that when the first light control panel D1 and the second light control panel D2 are powered on, the liquid crystals in the first light control liquid crystal layer LC1 and the liquid crystals in the second light control liquid crystal layer LC2 can be deflected in a same direction. Comparing FIG. 23 and FIG. 24, both a first liquid crystal lcm1 in the first light control liquid crystal layer LC1 and a second liquid crystal lcm2 in the second light control liquid crystal layer LC2 are pretilted in a plane formed by the Z axis and the X axis, and the first liquid crystal lcm1 is parallel to a long axis direction Q1Q1' of the second liquid crystal lcm2 in the pretilt state.

It should be noted that, the description that the long axis direction of the liquid crystal is parallel to the alignment direction of the alignment layer in any embodiment of the present disclosure means that, regardless of the pretilt direction of the liquid crystal, the long axis direction of the liquid crystal is parallel to the alignment direction of the alignment layer. That is, when the liquid crystal has a pretilt angle, the long axis direction of the liquid crystal is still considered to be parallel to the alignment direction of the alignment layer.

The description that the pretilt direction of the liquid crystal in the first light control liquid crystal layer LC1 is parallel to the pretilt direction of the liquid crystal in the second light control liquid crystal layer LC2 means that, regardless of the pretilt directions of the liquid crystal in the first light control liquid crystal layer LC1 and the liquid crystal in the second light control liquid crystal layer LC2, both a long axis of the liquid crystal in the first light control liquid crystal layer LC1 and a long axis of the liquid crystal in the second light control liquid crystal layer LC2 are paralleled to the alignment direction of each of the first alignment layer C1, the second alignment layer C2, the third alignment layer C3, and the fourth alignment layer C4.

In an embodiment, when the deflection directions of the liquid crystals of the two liquid crystal layers in the display module 10 are opposite to each other, the angle at which the first light control panel D1 achieves anti-peeping is opposite to the angle at which the second light control liquid crystal layer LC2 achieves anti-peeping, thereby achieving the function of anti-peeping at opposite sides, for example, achieving anti-peeping both at a left side and at a right side.

Figure 24:
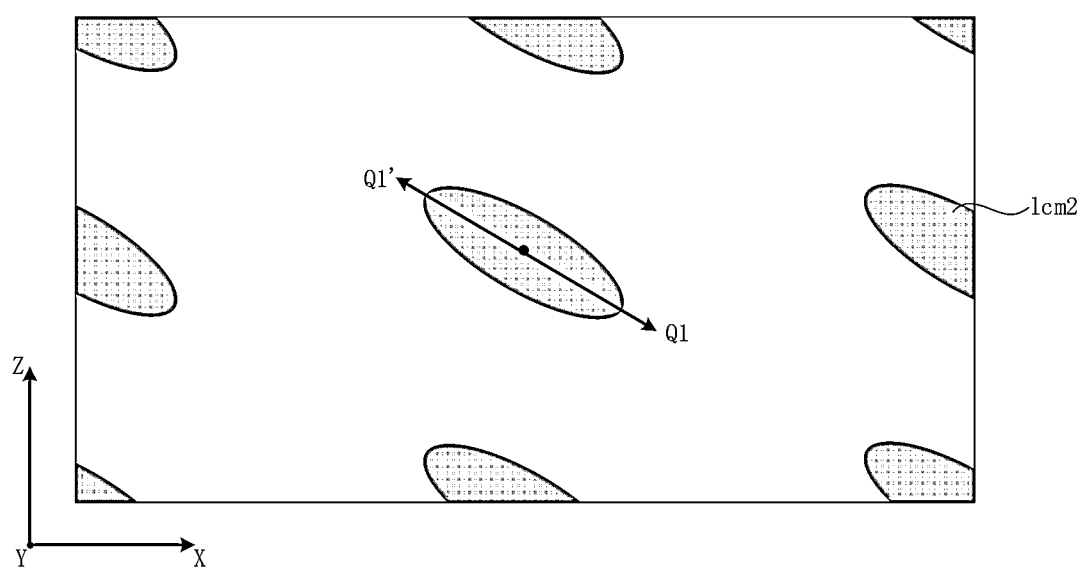
FIG. 24 is a partial schematic diagram of a first light control liquid crystal layer.

FIG. 24 is a partial schematic diagram of a first light control liquid crystal layer.

In an embodiment, comparing FIG. 22 and FIG. 24, a pretilt direction of the liquid crystals in the first light control liquid crystal layer LC1 intersects a pretilt direction of the liquid crystals in the second light control liquid crystal layer LC2, so as to ensure that when the first light control panel D1 and the second light control panel D2 are powered on, the liquid crystals in the first light control liquid crystal layer LC1 and the liquid crystals in the second light control liquid crystal layer LC2 can be deflected in opposite directions.

In an embodiment of the present disclosure, a pretilt direction of liquid crystals in the first light control liquid crystal layer LC1 intersects a pretilt direction of liquid crystals in the second light control liquid crystal layer LC2, so as to ensure that the liquid crystals in the first light control liquid crystal layer LC1 and the liquid crystals in the second light control liquid crystal layer LC2 can be deflected in opposite directions. Comparing FIG. 23 and FIG. 24, both a first liquid crystal lcm1 in the first light control liquid crystal layer LC1 and a second liquid crystal lcm2 in the second light control liquid crystal layer LC2 are pretilted in a plane formed by the Z axis and the X axis. In addition, when the first light control panel D1 is powered on and the second light control panel D2 is powered on, both the first liquid crystal lcm1 and the second liquid crystal lcm2 are deflected towards a direction close to the third direction Z within the plane formed by the Z axis and the X axis.

In an embodiment of the present disclosure, a pretilt angle of the liquid crystals in the first light control panel D1 is greater than or equal to 1°, and less than or equal to 3°. In this embodiment, the liquid crystals in the first light control liquid crystal layer LC1 has a pretilt angle, such that the liquid crystals in the first light control liquid crystal layer LC1 has an initial deflection angle. In this case, after the first light control panel D1 is powered on, a response time of the liquid crystals to an electric field can be shortened and a response speed of an anti-peeping function can be improved, thereby improving a display effect.

In an embodiment of the present disclosure, a pretilt angle of liquid crystals in the second light control panel D2 is greater than or equal to 1°, and less than or equal to 3°. In this embodiment, the liquid crystals of the second light control liquid crystal layer LC2 has a pretilt angle, such that the liquid crystals in the second light control liquid crystal layer LC2 has an initial deflection angle. In this case, after the second light control panel D2 is powered on, a response time of the liquid crystals to an electric field can be shortened and a response speed of the anti-peeping function can be improved, thereby improving a display effect.

For example, the polarization axis direction of the second polarizer P2 is 0°. In this case, the polarization axis direction of the first polarizer P1 is 90°, the polarization axis direction of the fourth polarizer P4 is 90°, and the polarization axis direction of the third polarizer P3 is 0°. Accordingly, the first alignment layer C1 and the second alignment layer C2 may be aligned along a direction of 225°, and the third alignment layer C3 and the fourth alignment layer C4 may be aligned along a direction of 45°. Since the first alignment layer C1 and the second alignment layer C2 are aligned along the direction opposite to that the third alignment layer C3 and the fourth alignment layer C4 are aligned along, the pretilt angle of the liquid crystals in the first light control panel D1 and the pretilt angle of the liquid crystals in the second light control panel D2 are equal to each other and the pretilt directions thereof intersect.

In an embodiment of the present disclosure, a birefringence of the liquid crystals included in the second light control liquid crystal layer LC2 is $\Delta n'$. A thickness of the second light control liquid crystal layer LC2 along the direction perpendicular to the surface of the second light control panel D2 is d', and 820 nm$\geq$($\Delta n'*d'$)$\geq$700 nm. That is, a maximum optical path difference obtained when different light passes through the second light control liquid crystal layer LC2 is greater than or equal to 700 nm, and less than or equal to 820 nm.

A change range of a polarization direction of the polarized light in the second light control liquid crystal layer LC2 is affected by the maximum optical path difference $\Delta L'$, and $\Delta L'=\Delta n'*d'$. When 820 nm$\geq\Delta L'\geq$700 nm, light with a light mount closer to a preset light amount is capable of passing through the fourth polarizer P4, such that a transmittance of the polarized light in the second light control panel D2 is improved.

In an embodiment of the present disclosure, when the display module includes a first light control panel D1 and a second light control panel D2, the maximum optical path difference obtained when the different light transmits through the first light control liquid crystal layer LC1 is substantially equal to the maximum optical path difference obtained when the different light transmits through the second light control liquid crystal layer LC2, that is, ($\Delta n*d$)=($\Delta n'*d'$). In this case, the first light control panel D1 and the second light control panel D2 may be light control panels of a same structure, such that the difficulty of both design and preparation are reduced.

In an embodiment of the present disclosure, when the display module includes a first light control panel D1 and a second light control panel D2, the maximum optical path difference obtained when the different light transmits through the first light control liquid crystal layer LC1 may not be equal to the maximum optical path difference obtained when the different light transmits through the second light control liquid crystal layer LC2, that is, (Δn*d) ≠(Δn'*d'). The liquid crystal layers in the first light control panel D1 and the second light control panel D2 are configured to correspond to different maximum optical path differences, respectively, such that the color cast problem of the display module can be alleviated.

In an embodiment, one of (Δn*d) and (Δn'*d') may range from 700 nm to 750 nm, and the other one may range from 750 nm to 820 nm. For example, the first light control liquid crystal layer LC1 corresponds to the following: 750 nm≥ (Δn*d)≥700 nm, and the second light control liquid crystal layer LC2 corresponds to the following: 820 nm≥(Δn'*d') ≥750 nm. In this case, white light transmitted through the first light control panel D1 may have a color cast problem of being reddish, and white light transmitted through the second light control panel D2 may have a color cast problem of being greenish. When the first light control panel D1 and the second light control panel D2 are stacked, the reddish light and the greenish light transmitted through the two panels, respectively, can be mixed to obtain light close to white light, which avoids, as much as possible, a problem that the display panel DP receives light with a color cast.

It should be noted that, in some embodiments, the second light control liquid crystal layer LC2 corresponds to the following: 750 nm≥(Δn*d)≥700 nm, and the first light control liquid crystal layer LC1 corresponds to the following: 820 nm≥(Δn*d)≥750 nm.

In an embodiment of the present disclosure, the display panel DP may be a liquid crystal display panel, that is, the display panel DP includes a display liquid crystal layer lc. A birefringence of a liquid crystal included in the display liquid crystal layer lc is Δn0. A thickness of the display liquid crystal layer lc along a direction perpendicular to the surface of the display panel DP is d0. (Δn0*d0) is less than (Δn*d) and/or (Δn0*d0) is less than (Δn'*d'), that is, a maximum optical path difference obtained when different light is transmitted through the display liquid crystal layer lc is less than at least one of: a maximum optical path difference obtained when different light is transmitted through the first light control liquid crystal layer LC1, and a maximum optical path difference obtained when different light is transmitted through the second light control liquid crystal layer LC2.

(Δn0*d0) corresponding to the display panel DP is configured to be relatively small, such that it can be ensured that the display panel DP has relatively high contrast and chromaticity during display. In addition, when the display panel DP is an in-plane switching (IPS) display panel, (Δn0*d0) corresponding to the display liquid crystal layer lc can be configured to be relatively small via d0 to be configured relatively small. In this case, the liquid crystals in the display liquid crystal layer lc far away from a pixel electrode and a common electrode are more prone to be driven and deflected.

In an embodiment, 400 m≥(Δn0*d0)≥300 nm. For example, (Δn0*d0)=350 nm.

Figure 25:
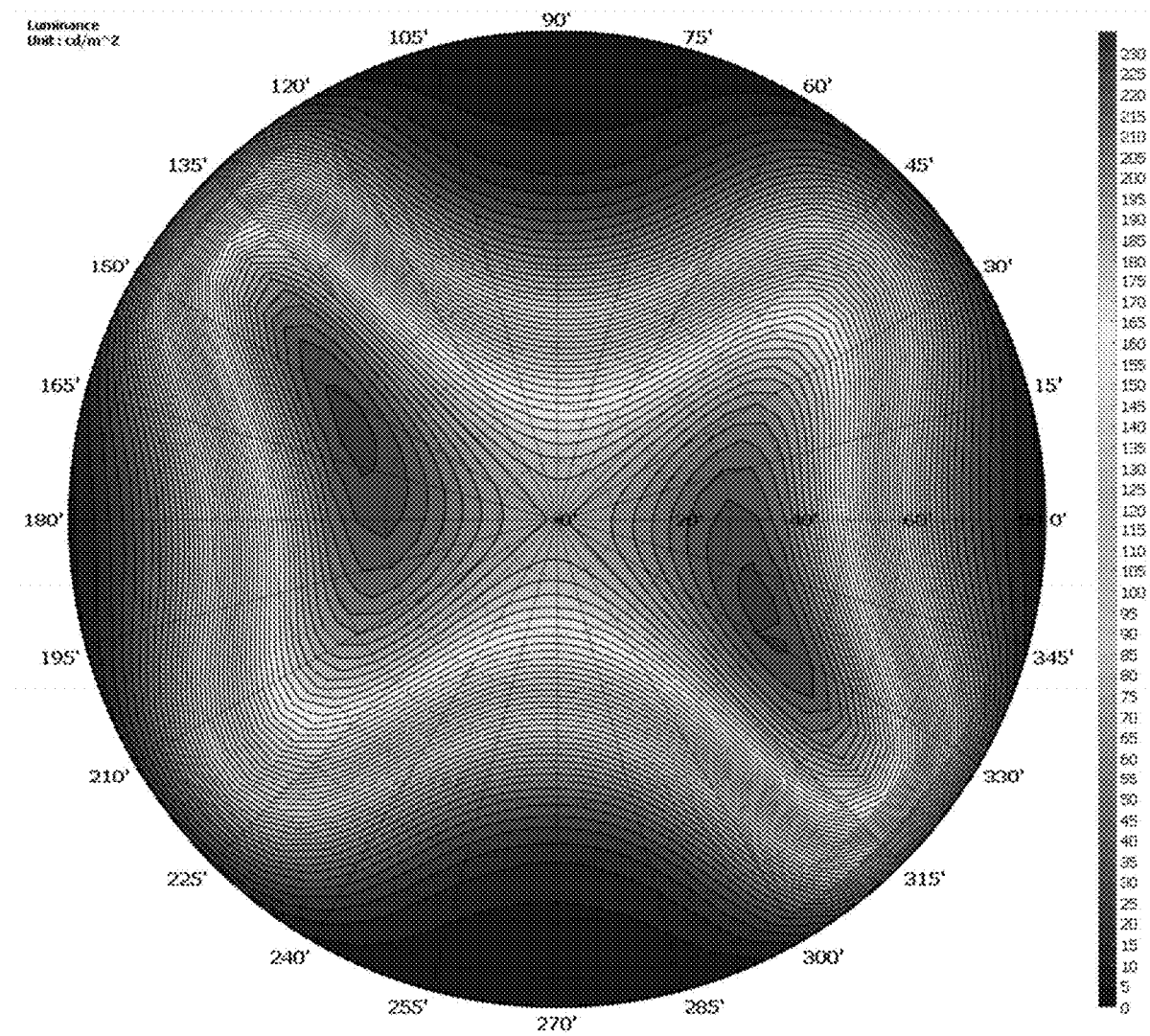
FIG. 25 is a brightness diagram of a display module, at different viewing angles in a first display mode, according to an embodiment of the present disclosure.
Figure 26:
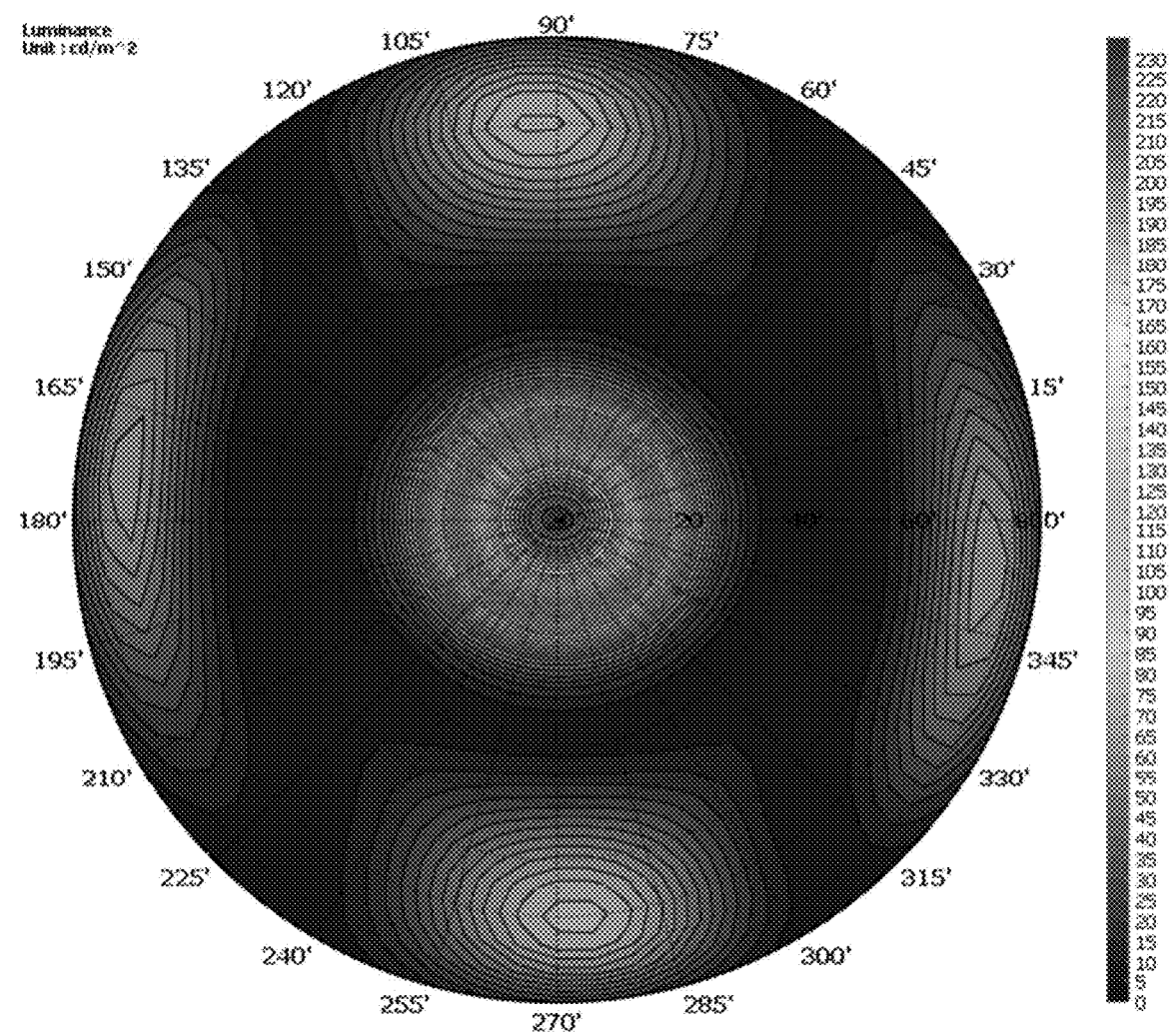
FIG. 26 is a brightness diagram of a display module, at different viewing angles in a second display mode, according to an embodiment of the present disclosure.

FIG. 25 is a brightness diagram of a display module according to an embodiment of the present disclosure at different viewing angles in a first display mode. FIG. 26 is a brightness diagram of a display module according to an embodiment of the present disclosure at different viewing angles in a second display mode.

In the display module, as shown in FIG. 25 and FIG. 26, the pretilt direction of the liquid crystals in the first light control liquid crystal layer LC1 intersects the pretilt direction of the liquid crystals in the second light control liquid crystal layer LC2. In addition, the pretilt angle of the liquid crystals in the first light control liquid crystal layer LC1 is equal to the pretilt angle of the liquid crystals in the second light control liquid crystal layer LC2. It can be seen through comparison between FIG. 25 and FIG. 26 that, when the pretilt directions of the liquid crystals in the first light control panel D1 and the liquid crystals in the second light control panel D2 in the display module 10 intersect and the pretilt angles thereof are the same, the display module 10 can achieve effective anti-peeping at two opposite sides.

Figure 27:
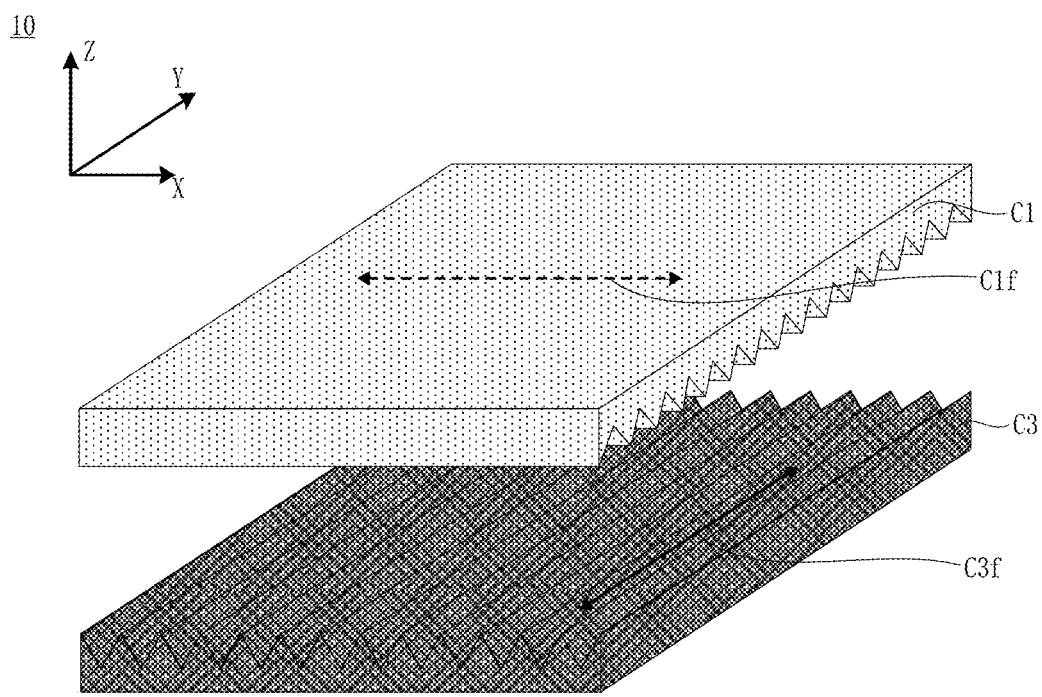
FIG. 27 is a partial schematic structural diagram of a display module according to an embodiment of the present disclosure.

FIG. 27 is a partial schematic structural diagram of a display module according to an embodiment of the present disclosure.

In an embodiment of the present disclosure, as shown in FIG. 27, the alignment direction of the first alignment layer C1 intersects the alignment direction of the third alignment layer C3. For example, with reference to FIG. 28 and FIG. 24, the alignment direction of the first alignment layer C1 is an extension direction of the first alignment axis C1f, and the alignment direction of the third alignment layer C3 is an extension direction of the third alignment axis C3f. The first alignment axis C1f intersects the third alignment axis C3f, and an angle between the first alignment axis C1f and the third alignment axis C3f is greater than 0° and less than 90°.

In an embodiment of the present disclosure, the first alignment axis C1f intersects the third alignment axis C3f, such that the long axis direction of the liquid crystals in the first light control panel D1 intersects the long axis direction of the liquid crystals in the second light control panel D2. Therefore, multi-angle anti-peeping can be achieved.

In an embodiment of the present disclosure, the alignment direction of the first alignment layer C1 is perpendicular to the alignment direction of the third alignment layer C3. As shown in FIG. 27, the first alignment axis C1f is parallel to the first direction X, the third alignment axis C3f is parallel to the second direction Y, and an angle between the first alignment axis C1f and the third alignment axis C3f is 90°.

In an embodiment of the present disclosure, the first alignment axis C1f is perpendicular to the third alignment axis C3f, such that the long axis direction of the liquid crystals in the first light control panel D1 is perpendicular to the long axis direction of the liquid crystals in the second light control panel D2, thereby facilitating achieving anti-peeping at four sides of the display module.

In an embodiment, a voltage difference between the first electrode E1 and the second electrode E2 may be within a range from 3 V to 6 V.

In addition, the anti-peeping mode of the display module can be switched between a symmetric anti-peeping mode and an asymmetric anti-peeping mode by controlling the voltage difference between the first electrode E1 and the second electrode E2. When the voltage difference between the first electrode E1 and the second electrode E2 is relatively small, for example, less than 4 V, the anti-peeping mode of the display module may be symmetric anti-peeping. In this case, the display module has the highest brightness at a front viewing angle. When the voltage difference between the first electrode E1 and the second electrode E2 is relatively large, for example, greater than or equal to 4 V, the anti-peeping mode of the display module may be asymmetric anti-peeping. In this case, the display module has the highest brightness at a viewing angle deviating from the front viewing angle.

When the display module includes the first light control panel D1 and the second light control panel D2, a voltage difference between the first electrode E1 and the second electrode E2 in the first light control panel D1 may be equal to a voltage difference between the third electrode E3 and the fourth electrode E4 in the second light control panel D2.

When the display module includes the first light control panel D1 and the second light control panel D2, the voltage difference between the first electrode E1 and the second electrode E2 in the first light control panel D1 may not be equal to the voltage difference between the third electrode E3 and the fourth electrode E4 in the second light control panel D2.

Figure 28:
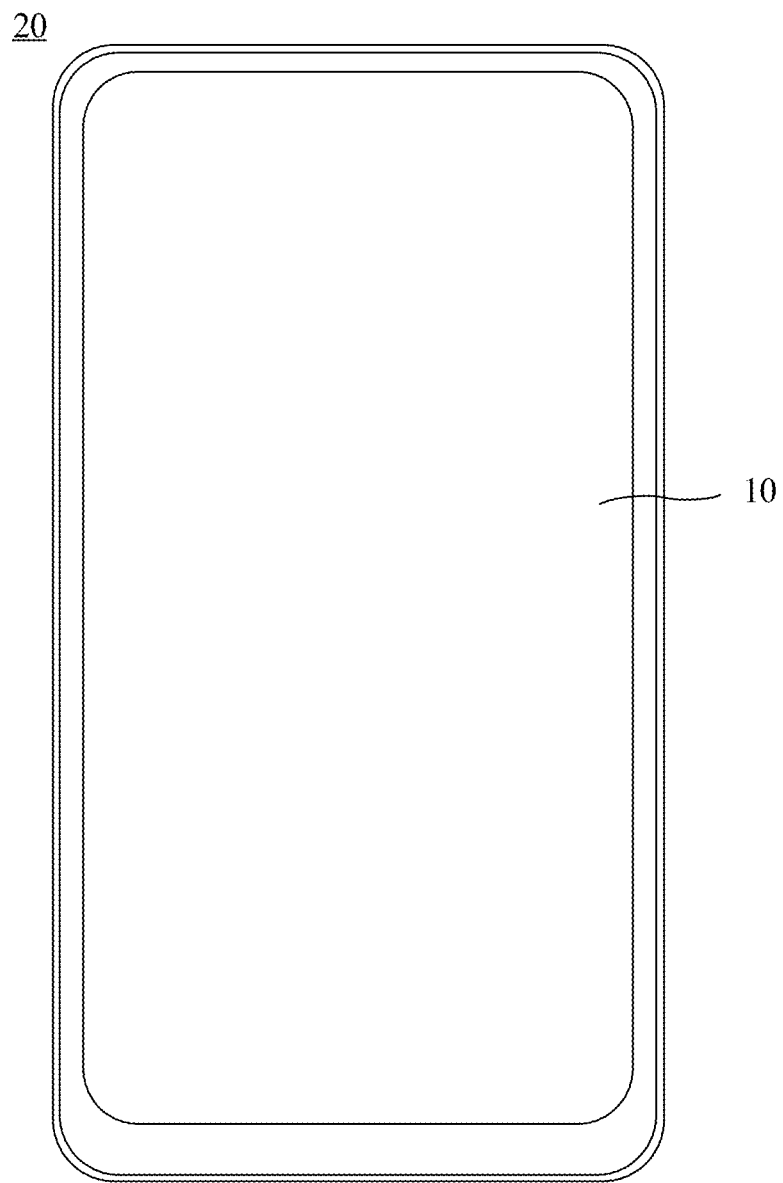
FIG. 28 is a schematic diagram of a display apparatus according to an embodiment of the present disclosure.

FIG. 28 is a schematic diagram of a display apparatus according to an embodiment of the present disclosure.

The present disclosure provides a display apparatus 20. As shown in FIG. 28, the display apparatus 20 includes the display module 10 according to any one of the aforementioned embodiments. The display apparatus 20 may be a mobile phone. In addition, the display apparatus 20 may also be an electronic device such as a computer, a television, a wearable display, or an in-vehicle display.

The display apparatus 20 according to the embodiments of the present disclosure can achieve more effective anti-peeping, thereby improving anti-peeping performance.

According to the display panel and the display apparatus provided in the embodiments of the present disclosure, when the display module performs display on the first light control panel in the sharing mode, power consumption can be reduced and color cast problems can be avoided in general. When the display module is in the anti-peeping mode, liquid crystals are tilted up at a certain angle along the direction perpendicular to the surface of the first light control panel, such that light in a specific propagation direction cannot be emitted from the first light control panel, thereby achieving more effective anti-peeping. In addition, an angle by which the liquid crystals are tilted up can be controlled by controlling a change of the electric field between the first electrode and the second electrode, and different anti-peeping viewing angles can be obtained. The above descriptions are merely favorable embodiments of the present disclosure and are not intended to limit the present disclosure. Any modification, equivalent replacement and improvement within the spirit and principle of the present disclosure shall be included within the protection scope of the present disclosure.

What is claimed is:

1. A display module, comprising:
    a first light control panel, comprising:
        a first base comprising a first substrate, a first electrode, a first alignment layer, and a first polarizer;
        a second base arranged opposite to the first base, and comprising a second substrate, a second electrode, a second alignment layer, and a second polarizer; and
        a first light control liquid crystal layer arranged between the first base and the second base,
        wherein the first electrode and the first alignment layer are arranged at a side of the first substrate facing the first light control liquid crystal layer, and the first polarizer is arranged at either the side of the first substrate facing the first light control liquid crystal layer, or a side of the first substrate facing away from the first light control liquid crystal layer; and
        wherein the second electrode and the second alignment layer are arranged at a side of the second substrate facing the first light control liquid crystal layer, and the second polarizer is arranged at either the side of the second substrate facing the first light control liquid crystal layer, or a side of the second substrate facing away from the first light control liquid crystal layer;
    a display panel arranged at a side of the first light control panel; and
    a second light control panel arranged at a side of the first light control panel away from the display panel, wherein the second light control panel comprises:
        a fifth base, comprising a fifth substrate, a third electrode, a third alignment layer, and a third polarizer;
        a sixth base arranged opposite to the fifth base, and comprising a sixth substrate, a fourth electrode, a fourth alignment layer, and a fourth polarizer; and
        a second light control liquid crystal layer arranged between the fifth base and the sixth base,
    wherein a polarization axis direction of the first polarizer is perpendicular to a polarization axis direction of the second polarizer, an alignment direction of the first alignment layer is parallel to an alignment direction of the second alignment layer, and an angle between the alignment direction of the first alignment layer and the polarization axis direction of the first polarizer is $\alpha$, where $90°>\alpha>0°$,
    wherein the third electrode and the third alignment layer are arranged at a side of the fifth substrate facing the second light control liquid crystal layer, and the third polarizer is arranged at a side of the fifth substrate,
    wherein the fourth electrode and the fourth alignment layer are arranged at a side of the sixth substrate facing the second light control liquid crystal layer, and the fourth polarizer is arranged at a side of the sixth substrate, and
    wherein a polarization axis direction of the third polarizer is perpendicular to a polarization axis direction of the fourth polarizer, an alignment direction of the third alignment layer is parallel to an alignment direction of the fourth alignment layer, and an angle between the alignment direction of the third alignment layer and the polarization axis direction of the fourth polarizer is $\beta$, and $90°>\beta 0°$.

2. The display module according to claim 1, wherein $80°\geq\alpha\geq30°$.

3. The display module according to claim 2, wherein $\alpha=45°$.

4. The display module according to claim 1, wherein a birefringence of liquid crystals comprised in the first light control liquid crystal layer is $\Delta n$, a thickness of the first light control liquid crystal layer is d, and $820\ nm\geq(\Delta n*d)\geq 700\ nm$.

5. The display module according to claim 1, wherein the display panel comprises a plurality of subpixels, wherein along a direction perpendicular to a surface of the display panel, a quantity of subpixels overlapping the first electrode is equal to a quantity of subpixels overlapping the second electrode.

6. The display module according to claim 1, wherein the display panel comprises a plurality of subpixels, wherein along a direction perpendicular to a surface of the display panel, a quantity of subpixels overlapping the first electrode is less than a quantity of subpixels overlapping the second electrode, and the second electrode overlaps at least two first electrodes.

7. The display module according to claim 6, wherein along the direction perpendicular to the surface of the display panel, the second electrode overlaps all first electrodes; and/or
    wherein along the direction perpendicular to the surface of the display panel, the first electrode overlaps one of plurality of the subpixels.

8. The display module according to claim 1, wherein the display panel comprises:
- a third base comprising a third substrate;
- a fourth base arranged opposite to the third base, and comprising a fourth substrate; and
- a display liquid crystal layer arranged between the third base and the fourth base,
- wherein the third base is arranged between the fourth base and the first light control panel, and the second base is arranged between the first base and the display panel, and
- wherein the second polarizer is arranged between the second substrate and the third substrate, and the second polarizer is attached to the second substrate, or the second polarizer is attached to the third substrate.

9. The display module according to claim 1, wherein the sixth base is arranged between the fifth base and the first base, the first polarizer is reused as the fourth polarizer; and the first polarizer is attached to the first substrate, or the first polarizer is attached to the sixth substrate.

10. The display module according to claim 1, wherein the first base is arranged between the sixth base and the second base, the first substrate is reused as the sixth substrate, and the first polarizer is reused as the fourth polarizer; and
- wherein the first polarizer comprises a metal grating arranged at a side of the first substrate facing the second base, or the first polarizer comprises a metal grating arranged at a side of the first substrate facing the sixth base.

11. The display module according to claim 1, wherein the alignment direction of the first alignment layer is parallel to the alignment direction of the third alignment layer.

12. The display module according to claim 11, wherein a pretilt direction of liquid crystals in the first light control liquid crystal layer is parallel to a pretilt direction of liquid crystals in the second light control liquid crystal layer.

13. The display module according to claim 11, wherein a pretilt direction of liquid crystals in the first light control liquid crystal layer intersects a pretilt direction of liquid crystals in the second light control liquid crystal layer, and a pretilt angle of the liquid crystals in the first light control liquid crystal layer is equal to a pretilt angle of the liquid crystals in the second light control liquid crystal layer.

14. The display module according to claim 1, wherein the alignment direction of the first alignment layer intersects the alignment direction of the third alignment layer.

15. The display module according to claim 14, wherein the alignment direction of the first alignment layer is perpendicular to the alignment direction of the third alignment layer.

16. The display module according to claim 1, wherein a pretilt angle of liquid crystals in the first light control liquid crystal layer is within a range from 1° to 3°.

17. The display module according to claim 1, wherein display modes of the display module comprise a first display mode and a second display mode, and a maximum light exit angle of the display module in the first display mode is greater than a maximum light exit angle of the display module in the second display mode;
- wherein in the first display mode, the display panel performs display, and a long axis of liquid crystals in the first light control liquid crystal layer is parallel to the alignment direction of the first alignment layer; and
- wherein in the second display mode, the display panel performs display, and the first electrode and the second electrode are configured to receive different voltage signals, respectively, to control the liquid crystals in the first light control liquid crystal layer to be deflected.

18. The display module according to claim 17, wherein in the second display mode, respectively, to control the liquid crystals in the first light control liquid crystal layer to be deflected, and an angle between the long axis of the deflected liquid crystal and a surface of the first substrate is within a range from 40° to 80°.

19. A display apparatus, comprising a display module comprising:
- a first light control panel, comprising:
  - a first base comprising a first substrate, a first electrode, a first alignment layer, and a first polarizer;
  - a second base arranged opposite to the first base, and comprising a second substrate, a second electrode, a second alignment layer, and a second polarizer; and
  - a first light control liquid crystal layer arranged between the first base and the second base,
  - wherein the first electrode and the first alignment layer are arranged at a side of the first substrate facing the first light control liquid crystal layer, and the first polarizer is arranged at either the side of the first substrate facing the first light control liquid crystal layer, or a side of the first substrate facing away from the first light control liquid crystal layer; and
  - wherein the second electrode and the second alignment layer are arranged at a side of the second substrate facing the first light control liquid crystal layer, and the second polarizer is arranged at either the side of the second substrate facing the first light control liquid crystal layer, or a side of the second substrate facing away from the first light control liquid crystal layer;
- a display panel arranged at a side of the first light control panel; and
- a second light control panel arranged at a side of the first light control panel away from the display panel, wherein the second light control panel comprises:
  - a fifth base, comprising a fifth substrate, a third electrode, a third alignment layer, and a third polarizer;
  - a sixth base arranged opposite to the fifth base, and comprising a sixth substrate, a fourth electrode, a fourth alignment layer, and a fourth polarizer; and
  - a second light control liquid crystal layer arranged between the fifth base and the sixth base,
- wherein a polarization axis direction of the first polarizer is perpendicular to a polarization axis direction of the second polarizer, an alignment direction of the first alignment layer is parallel to an alignment direction of the second alignment layer, and an angle between the alignment direction of the first alignment layer and the polarization axis direction of the first polarizer is α, where 90°>α>0°,
- wherein the third electrode and the third alignment layer are arranged at a side of the fifth substrate facing the second light control liquid crystal layer, and the third polarizer is arranged at a side of the fifth substrate,
- wherein the fourth electrode and the fourth alignment layer are arranged at a side of the sixth substrate facing the second light control liquid crystal layer, and the fourth polarizer is arranged at a side of the sixth substrate, and
- wherein a polarization axis direction of the third polarizer is perpendicular to a polarization axis direction of the fourth polarizer, an alignment direction of the third alignment layer is parallel to an alignment direction of the fourth alignment layer, and an angle between the alignment direction of the third alignment layer and the polarization axis direction of the fourth polarizer is $\beta$, and 90°>$\beta$0°.

\* \* \* \* \*